(12) United States Patent
Iwaki et al.

(10) Patent No.: US 11,780,137 B2
(45) Date of Patent: Oct. 10, 2023

(54) MOLD, INJECTION MOLDING SYSTEM, AND METHOD FOR MANUFACTURING MOLDED PRODUCT

(71) Applicant: CANON KABUSHIKI KAISHA, Tokyo (JP)

(72) Inventors: Yusuke Iwaki, Kanagawa (JP); Toshihiko Iizuka, Kanagawa (JP); Yasuhiro Kotani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 17/474,704

(22) Filed: Sep. 14, 2021

(65) Prior Publication Data

US 2022/0080638 A1 Mar. 17, 2022

(30) Foreign Application Priority Data

Sep. 16, 2020 (JP) .................. 2020-155595

(51) Int. Cl.
*B29C 45/66* (2006.01)
*B29C 45/76* (2006.01)
*B29C 45/04* (2006.01)

(52) U.S. Cl.
CPC .......... *B29C 45/66* (2013.01); *B29C 45/0416* (2013.01); *B29C 45/76* (2013.01)

(58) Field of Classification Search
CPC ................ B29C 45/66; B29C 45/0416; B29C 2045/642
See application file for complete search history.

(56) References Cited

U.S. PATENT DOCUMENTS

| 5,456,588 A * | 10/1995 | Yonekubo ........... B29C 45/0416 425/185 |
| 2014/0202652 A1* | 7/2014 | Yamaguchi ........... B29C 33/202 164/303 |
| 2019/0322024 A1* | 10/2019 | Yoon ................. B29C 45/14073 |

FOREIGN PATENT DOCUMENTS

| JP | 64-36421 A | 2/1989 | |
| JP | 01263007 A | 10/1989 | |
| JP | 04361016 A * | 12/1992 | ......... B29C 45/0416 |
| JP | 04361016 A | 12/1992 | |
| JP | 08174615 A | 7/1996 | |
| JP | 08267523 A | 10/1996 | |
| JP | 0927213 A | 1/1997 | |
| JP | 2002067043 A | 3/2002 | |
| JP | 2005313564 A | 11/2005 | |
| JP | 5351494 B2 * | 11/2013 | |
| JP | 3198166 U | 5/2015 | |
| JP | 3198166 U * | 6/2015 | |
| KR | 1568568 B1 * | 11/2015 | ............. B22D 17/26 |

\* cited by examiner

*Primary Examiner* — Kelly M Gambetta
*Assistant Examiner* — Virak Nguon
(74) *Attorney, Agent, or Firm* — Canon U.S.A., Inc. IP Division

(57) ABSTRACT

A mold includes a stationary mold, a movable mold, a coupling unit that performs coupling and uncoupling of the stationary mold and the movable mold, a coupling portion movement unit that moves a coupling portion of the stationary mold and the movable mold in a mold closing direction, and a control unit that controls the coupling unit and the coupling portion movement unit.

20 Claims, 14 Drawing Sheets

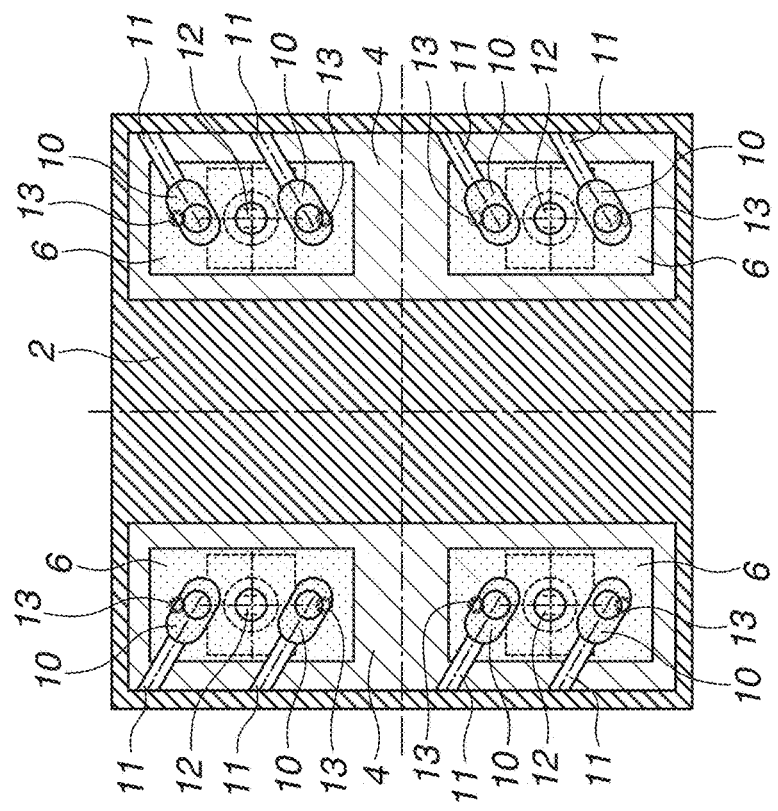
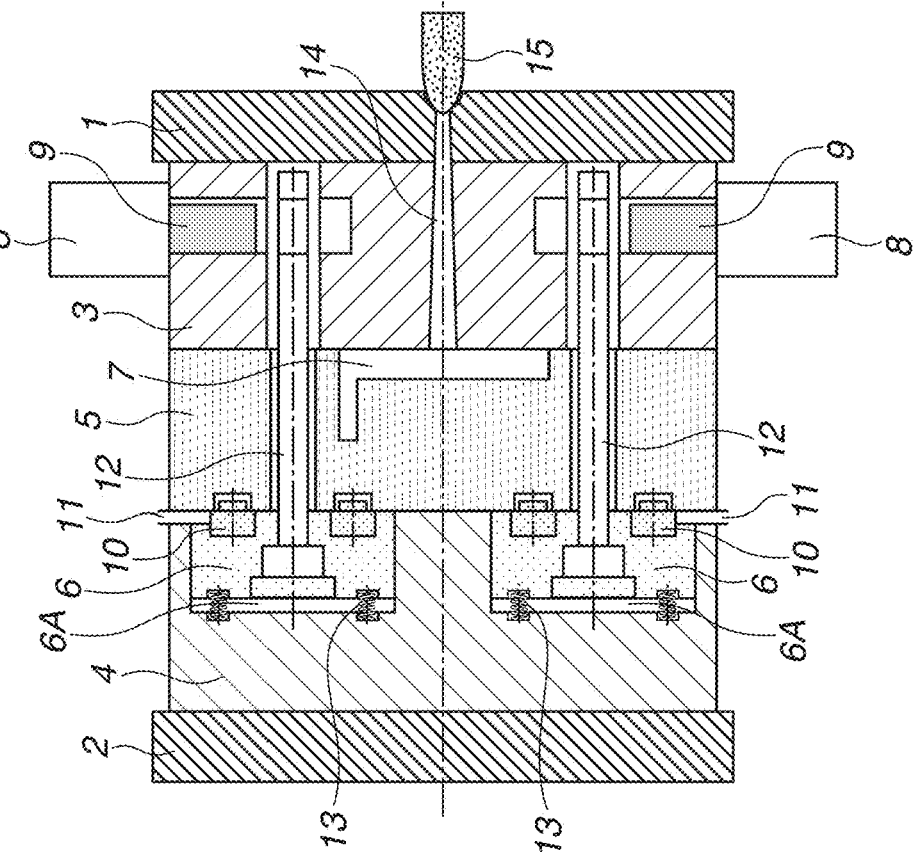

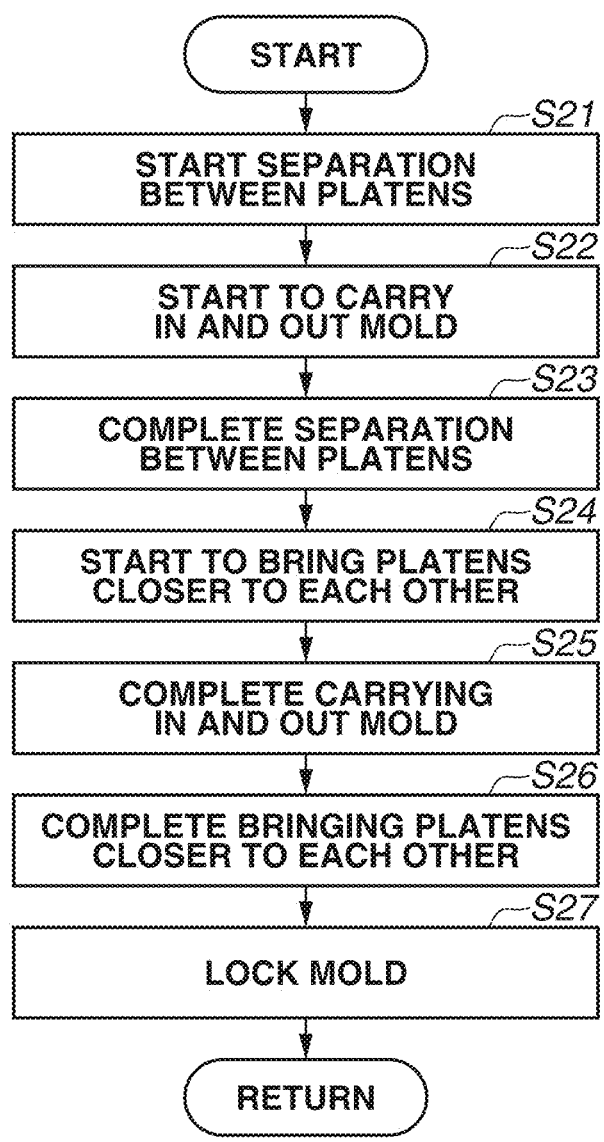

MOLD, INJECTION MOLDING SYSTEM, AND METHOD FOR MANUFACTURING MOLDED PRODUCT

BACKGROUND OF THE INVENTION

Field of the Invention

The present disclosure relates to a mold, an injection molding system, and a method for manufacturing a molded product.

Description of the Related Art

Conventionally, inventions such as those described below have been discussed as methods for improving productivity of molded products.

For example, according to the invention in Japanese Patent Application Laid-Open No. 64-036421, a detachable unit mold is arranged to each of a stationary mold plate and a movable mold plate, and a coupling member for coupling and integrating the unit molds after mold clamping and injection is attached, so that the unit molds are coupled and integrated while a runner in the molds is blocked with the coupling member. The integrated unit molds are taken out from between the mold plates and cooled on the outside of a molding apparatus. Other unit molds are attached to the mold plates during the cooling, and a similar cycle is repeated to shorten a molding time while securing a sufficient cooling time for each.

According to the invention in Japanese Patent Application Laid-Open No. 04-361016, a technique is discussed in which a movable side unit and a stationary side unit which can be freely opened and closed are arranged, and a hydraulic cylinder or a motor is provided inside the movable side unit. The movable side unit is always coupled to the stationary side unit by a pinion which engages with a pinion gear of a rod of the hydraulic cylinder or a rotation shaft of the motor. This mechanism performs opening and closing of the mold and self-maintaining mold clamping. Further, proposed is the invention of reducing a molding cycle by a molding method in which the unit mold which self-maintains the mold clamping is moved between a stationary platen and a movable platen of a molding apparatus during a cooling process, and removing another cavity unit and injection can be performed during the long cooling process.

SUMMARY

According to an aspect of the present disclosure, a mold includes a stationary mold, a movable mold, a coupling unit that performs coupling and uncoupling of the stationary mold and the movable mold, a coupling portion movement unit that moves a coupling portion of the stationary mold and the movable mold in a mold closing direction, and a control unit that controls the coupling unit and the coupling portion movement unit.

According to another aspect of the present disclosure, a mold includes a stationary mold, a movable mold, a first unit including a first coupling member and a second coupling member and configured to perform coupling and uncoupling of the stationary mold and the movable mold, and a second unit configured to adjust a force to be act in a mold closing direction of each of the stationary mold and the movable mold between the first coupling member and the second coupling member.

According to an aspect of the present disclosure, an injection molding system includes an injection molding apparatus which includes an injection nozzle and the mold.

According to yet another aspect of the present disclosure, provided is a method for manufacturing a molded product by the injection molding system.

Further features of the present disclosure will become apparent from the following description of exemplary embodiments with reference to the attached drawings.

BRIEF DESCRIPTION OF THE DRAWINGS

FIGS. 1A and 1B are each a diagram illustrating a first exemplary embodiment of the present disclosure.

FIGS. 13A and 13B are each a diagram illustrating the first exemplary embodiment of the present disclosure.

DESCRIPTION OF THE EMBODIMENTS

According to the method discussed in Japanese Patent Application Laid-Open No. 64-036421, in a case where the apparatus is to be automated, a large-scale apparatus, such as a robot, is required to remove the unit from the mold plate and attach another unit thereto. The invention has requires an apparatus for taking out a molded product from the mold of the unit, which is a shortcoming. According to the method discussed in Japanese Patent Application Laid-Open No. 04-361016, a mold opening and closing amount depends on a stroke amount of the hydraulic cylinder, and in a case where a component has a large shape in a mold opening and closing direction, the mold opening and closing amount needs to be equal or larger than the shape. Since it is necessary to secure a large stroke amount of the hydraulic cylinder, a thickness of the mold increases, and also it is necessary to take a measure to extend the mold opening and closing stroke amount in the molding apparatus or to increase a size of the molding apparatus, which results in an increase in a cost of the apparatus. Further, since the movable side unit and the stationary side unit are always coupled by the rod of the hydraulic cylinder or the pinion, it is difficult to take out a large-sized molded product because this mechanism becomes an obstacle, which is an issue.

The present disclosure is directed to the provision of a mold, an injection molding system, and a manufacturing method of a molded product which can provide a molded product having excellent external appearance quality and dimensional quality and can improve productivity.

A mold, an injection molding system, and a manufacturing method of a molded product according to a first exemplary embodiment of the present disclosure will be described.

In the following descriptions, a mold that enables generation of a mold closing force which is an independent mold clamping force of the mold itself, instead of a mold clamping force applied by an injection molding apparatus, an injection molding system using the mold, and a manufacturing method of a molded product will be described.

In the present specification, an independent mold clamping force of the mold itself, which is not a mold clamping force applied from the injection molding apparatus may be referred to as a "mold closing force", and a mechanism for generating the independent mold closing force may be referred to as a mold closing mechanism.

FIGS. 1A, 1B, and FIGS. 2 to 5 illustrate the mold according to the first exemplary embodiment of the present disclosure. FIGS. 1A and 2 to 5 are cross-sectional views of the mold, and FIG. 1B is a front view of a first mold plate 4 of a movable mold of the mold.

The injection molding system according to the present exemplary embodiment will be described.

Figure 11A:
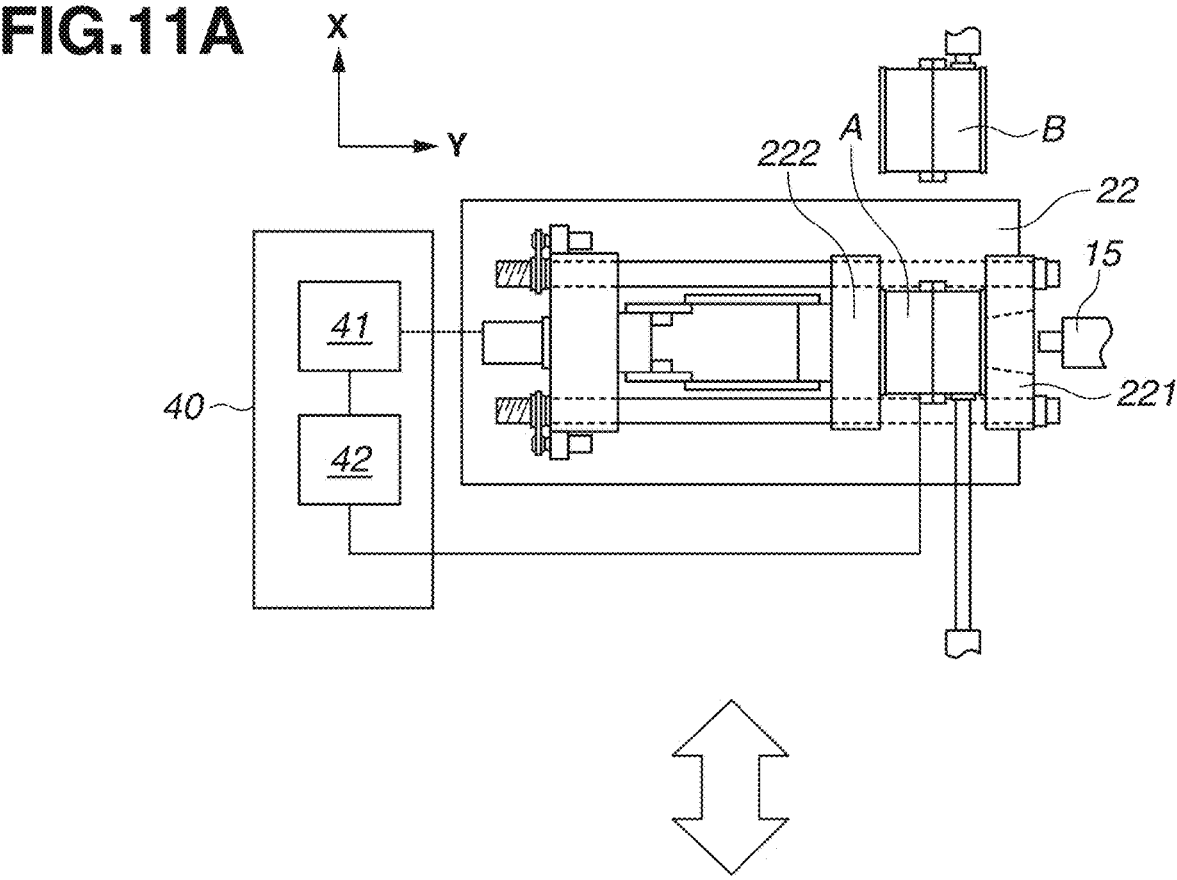
FIGS. 11A and 11B are each a diagram illustrating the first exemplary embodiment of the present disclosure.
Figure 11B:
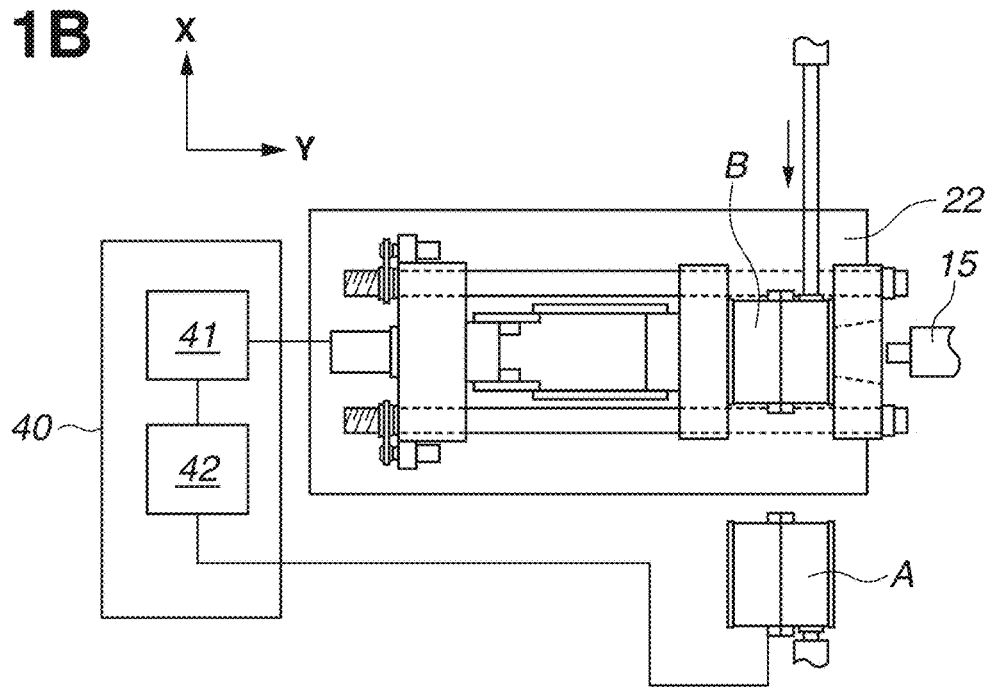

FIGS. 11A and 11B illustrate a process in which a single molding apparatus produces a molded product by injection molding using two injection molding molds (simply referred to as molds in some cases) according to the first exemplary embodiment. In FIGS. 11A and 11B, an injection molding apparatus 22 (simply referred to as a molding apparatus in some cases) includes an injection nozzle 15.

FIG. 11A illustrates a state in which a mold A (referred to as a first mold in some cases) is attached to the molding apparatus 22. FIG. 11B illustrates a state in which the mold A is removed from the molding apparatus 22, and a mold B is attached to the molding apparatus 22.

A control unit 40 includes a controller 41 which controls the injection molding apparatus 22 and a controller 42 which controls a mold closing mechanism (not illustrated) of the mold A (and/or the mold B). Each of the controllers 41 and 42 includes, for example, a processor, such as a central processing unit (CPU), a storage device, such as a random access memory (RAM), a read only memory (ROM), and a hard disk, and an interface to be connected to a sensor and an actuator. The processor executes a program stored in the storage device. The controller 41 is communicably connected to the controller 42 and causes the controller 42 to output a signal to a coupling portion drive unit or a movement portion drive unit, which will be described below, of the mold A (and/or the mold B). The controller 42 transmits to the controller 41 an operation completion signal, and an emergency stop signal if an abnormality occurs.

The mold A in FIGS. 11A and 11B will be described with reference to FIGS. 1A, 1B, and 2 to 5. While the mold A will be described here, the mold B in FIGS. 11A and 11B may have a similar configuration.

In FIGS. 1A, 1B, and 2 to 5, the mold A includes a mounting plate 1 of a stationary mold, a mounting plate 2 of a movable mold, a mold plate 3 of the stationary mold, and the first mold plate 4 and a second mold plate 5 of the movable mold. The stationary mold of the mold A includes the mounting plate 1 and the mold plate 3. The movable mold of the mold A includes the mounting plate 2, the first mold plate 4, and the second mold plate 5. The mold A includes blocks 6 attached inside the movable mold, spaces 6A each formed between the respective blocks 6 and the second mold plate 5 of the movable mold, and a cavity 7 into which molten resin flows from the molding apparatus 22 (refer to FIGS. 11A and 11B). The mold A further includes air cylinders 8 and coupling stoppers 9 each of which is inserted into the corresponding one of coupling pins 12 to form a coupling portion 31 (refer to FIG. 3) for coupling the movable mold to the stationary mold. The coupling stoppers 9 are each driven by the corresponding one of the air cylinders 8 to perform coupling and uncoupling of the stationary mold and the movable mold. The air cylinder 8 moves the corresponding coupling stopper 9 in X direction (the direction orthogonal to a mold opening and closing direction in the present exemplary embodiment) intersecting with the mold opening and closing direction (Z direction). The Z direction, which is the mold opening and closing direction, is a collective designation for Z1 direction and Z2 direction which are opposite to each other. The X direction, which is the intersecting direction (the orthogonal direction) intersecting with (orthogonal to) the mold opening and closing direction, is a collective designation for X1 direction and X2 direction which are opposite to each other. The mold A yet further includes hydraulic cylinders 10 and hydraulic hoses 11 for supplying and discharging oil for driving the hydraulic cylinders 10. The hydraulic cylinders 10 each serve as the coupling portion movement unit for moving the respective coupling portion 31 (refer to FIG. 3) by moving the corresponding block 6. The coupling pins 12 attached to the respective blocks 6 each have a hole into which the corresponding coupling stopper 9 is inserted. The mold A further includes springs 13 and a sprue 14. The blocks 6 are each configured to return to an original position from a position moved by the hydraulic cylinders 10. Thus, the springs 13 may be called a hydraulic cylinder return springs. The injection nozzle 15 is included in the molding apparatus 22 (refer to FIGS. 11A and 11B). The mounting plates 1 and 2, the mold plates 3, 4, and 5, the blocks 6, the air cylinders 8, the coupling stoppers 9, the hydraulic cylinders 10, the coupling pins 12, the springs 13, and the sprue 14 are each a component (a member) of the mold A (or the mold B). The coupling stoppers 9 and the coupling pins 12, which are included in a coupling unit and form the coupling portions 31, can be referred to as coupling components or coupling members.

The hydraulic cylinders 10 and the hydraulic hoses 11 are attached to the blocks 6 attached inside the movable mold as the coupling portion movement units which move the blocks 6 and the coupling pins 12 toward the mounting plate 2 (arrow Z1 direction in FIG. 3) of the movable mold. In other words, the movement portion drive units move the coupling portions (31 in FIG. 3) of the coupling pins 12 and the coupling stoppers 9 in the mold closing direction (the arrow Z1 direction in FIG. 3). The coupling portion movement units may include the springs 13 for moving the coupling portions 31 in the mold opening direction (arrow Z2 direction in FIG. 4) by moving the blocks 6 and the coupling pins 12 toward the mounting plate 1 of the stationary mold. Possible drive sources for the coupling portion movement units are a pneumatic or electric type in addition to a hydraulic one, but it is desirable to select the hydraulic drive source in order to generate a large pressure equivalent to the mold clamping force.

The mold closing mechanism according to the present exemplary embodiment includes the coupling portions for coupling the stationary mold and the movable mold, the coupling units for coupling and uncoupling the stationary mold and the movable mold, and the coupling portion movement units for pressing (moving) the coupling portion in the mold closing direction. Each coupling portion movement unit presses the coupling portion in the mold closing direction and releases the pressing. According to the present exemplary embodiment, the respective coupling portion corresponds to a contact portion of the corresponding coupling pin 12 and coupling stopper 9, and the respective coupling unit corresponds to the corresponding coupling pin 12, the coupling stopper 9, and the air cylinder 8. The respective coupling portion movement unit corresponds to the corresponding block 6 and hydraulic cylinder 10 (and the hydraulic hose 11).

A total of four coupling pins 12 are arranged at the four corners inside the second mold plate 5 of the movable mold. Two hydraulic cylinders 10 are attached to both sides of each coupling pin 12, namely, a total of eight hydraulic cylinders 10 are attached. The hydraulic cylinders 10 are each connected to an external hydraulic pump (not illustrated) via the respective hydraulic hoses 11.

According to the present exemplary embodiment, the example has been described in which the total of four coupling pins 12 are arranged. However, the number of coupling pins 12 is not limited to this example. For example, it is desirable to arrange two or more and 32 or less pieces of the coupling pins 12, more desirably, 3 or more and 16 or less. Such an arrangement enables a uniform mold closing force to be generated in the mold A even in a state in which the mold A is removed from the molding apparatus 22. If the number of coupling pins 12 is large, a larger mold closing force can be obtained. However, if the number of coupling pins 12 is too large, it is necessary to reduce a size of each mold closing mechanism, so that the mold closing force is weakened conversely, resulting in an increase in an apparatus cost. The example has been described in which two hydraulic cylinders 10 are arranged for each coupling pin 12, but the present exemplary embodiment is not limited to this example. The number of hydraulic cylinders 10 may be one as long as a pressure sufficient to move the coupling portions can be generated. The number of hydraulic cylinders 10 may be more than two, but the apparatus cost increases.

One of the coupling stopper 9 is attached to the corresponding air cylinder 8 attached to the mold plate 3 of the stationary mold, and the coupling stopper 9 can be advanced to a position at which the coupling stopper 9 is inserted into the hole of the corresponding coupling pin 12 (in arrow X1 direction in FIG. 2) by operating the corresponding air cylinder 8. The coupling stopper 9 can also be retracted to a position at which a mold opening operation can be performed (in arrow X2 direction in FIG. 4). The coupling stopper 9 is inserted into the hole of the coupling pin 12, so that the mold A can be removed from the molding apparatus 22 in a state in which the stationary mold and the movable mold are not opened by a predetermined distance or more. However, with this configuration alone, a gap appears between the stationary mold (the mold plate 3 of the stationary mold) and the movable mold (the second mold plate 5 of the movable mold). If such a gap appears, resin which is not sufficiently solidified may leak out, and a required accuracy for the molded product may not be obtained. Thus, the hydraulic cylinders 10 are operated to move the blocks 6 in a direction of approaching the mounting plate 2 of the movable mold (the arrow Z1 direction in FIG. 3). Thus, the coupling pins 12 are also moved in the direction of approaching the mounting plate 2 of the movable mold (the arrow Z1 direction in FIG. 3) together with the blocks 6. This movement brings the coupling pins 12 and the coupling stoppers 9 into contact with each other to form the coupling portions 31. The coupling stoppers 9 are moved in the direction of approaching the mounting plate 2 of the movable mold (the arrow Z1 direction in FIG. 3) by the coupling portions 31, and thus the stationary mold can be drawn toward the movable mold side.

In other words, the coupling portions 31 are moved in the mold closing direction, and thus it is possible to prevent a gap from appearing between the stationary mold (the mold plate 3 of the stationary mold) and the movable mold (the second mold plate 5 of the movable mold). Specifically, operating of the hydraulic cylinders 10 moves the blocks 6 and the coupling pins 12 in a direction in which the spaces 6A formed between the blocks 6 and the second mold plate 5 of the movable mold become narrower (a direction in which distances between the blocks 6 and the second mold plate 5 of the movable mold become shorter). The hydraulic cylinders 10 are operated in a state in which the corresponding coupling stopper 9 is advanced (in the arrow X1 direction in FIG. 2) to the position at which the coupling stopper 9 can be coupled to the corresponding coupling pin 12. The respective coupling stopper 9 then comes into contact with and is coupled to the corresponding coupling pin 12, which enables a force generated by the hydraulic cylinders 10 to act as a force in the mold closing direction of the stationary mold (the arrow Z1 direction in FIG. 3). Thus, the mold closing force can be generated between the movable mold and the stationary mold. Accordingly, even if the mold A is removed from the molding apparatus 22, it is possible to prevent a gap from appearing between the stationary mold (the mold plate 3 of the stationary mold) and the movable mold (the second mold plate 5 of the movable mold).

The blocks 6 are each configured to return to an original position with the respective springs 13 in response to the operation of the hydraulic cylinders 10 being released. Specifically, the blocks 6 are moved in a direction in which the distances between the respective blocks 6 and the second mold plate 5 of the movable mold become longer (in a direction of returning to an original length, i.e., the arrow Z2 direction in FIG. 4) in the spaces 6A each formed between the respective blocks 6 and the second mold plate 5 of the movable mold. The spaces 6A are provided in such a manner, so that the mold closing force can be generated by the mold A alone even in a case where the mold clamping force of the molding apparatus 22 acts on the mold A. If the operation of the hydraulic cylinders 10 is released, the force acting on the stationary mold in the mold closing direction (the arrow Z1 direction in FIG. 3) can be relaxed. As described above, the hydraulic cylinders 10 enables adjustment of the force acting in the mold closing direction of the stationary mold and the movable mold between the coupling stoppers 9 and the coupling pins 12 (the coupling portions 31).

In the mold A having the above-described configuration, molten resin is injected from the injection nozzle 15 of the molding apparatus 22 (refer to FIGS. 11A and 11B) into the cavity 7 via the sprue 14, and a molded product 20 is formed.

FIGS. 1A, 1B, and FIGS. 2 to 5 illustrate a series of operations of the mold closing mechanism from a process for attaching the mold A according to the present exemplary embodiment to the molding apparatus 22 to a process for removing the mold A therefrom.

FIGS. 1A and 1B illustrate a state in which the mold clamping force from the molding apparatus 22 is being generated in the mold A. Specifically, the mold A is attached to the molding apparatus 22 at a mold opening position at which the mold A is attached to the molding apparatus 22, and then the movable mold is operated to a mold closing position. Subsequently, the molding apparatus 22 applies a predetermined mold clamping force to the movable mold (the mounting plate 2, the first mold plate 4, and the second mold plate 5) and the stationary mold (the mounting plate 1 and the mold plate 3). The injection nozzle 15 is brought into pressure contact with the mounting plate 1 of the stationary mold with a force sufficiently smaller than the mold clamping force in a direction toward the mounting plate 1.

Figure 2:
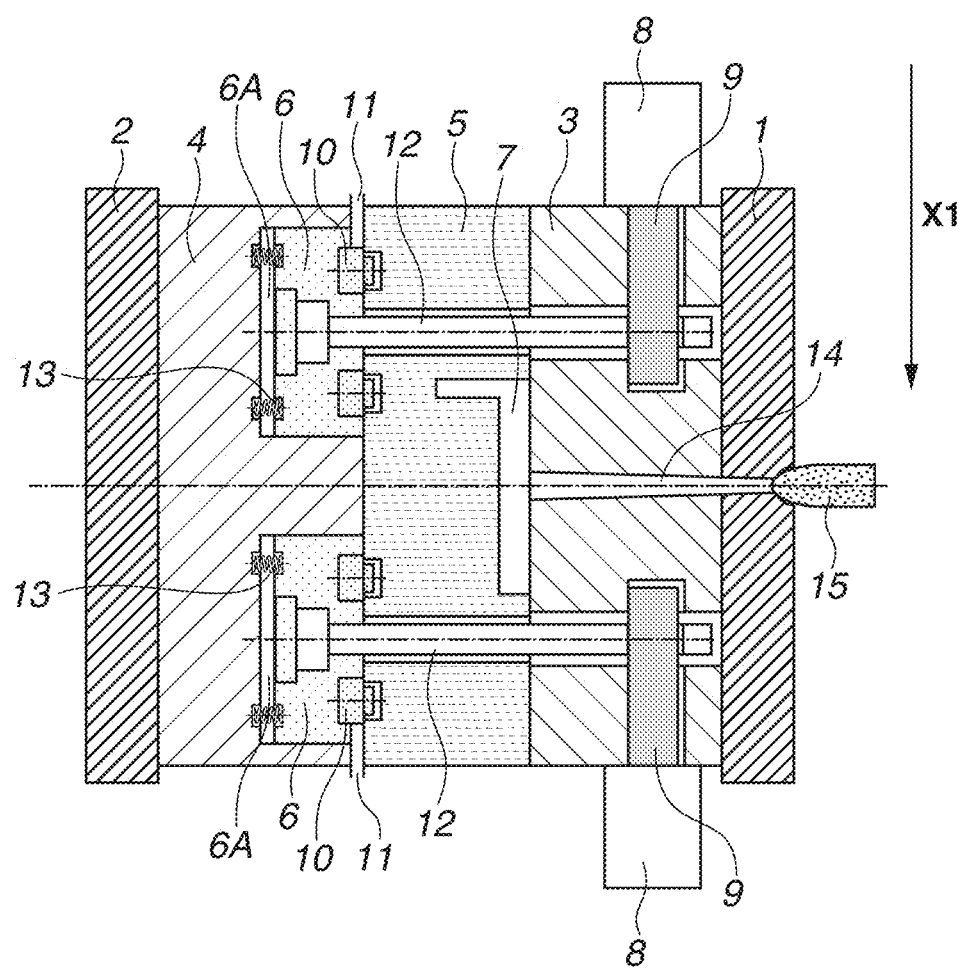
FIG. 2 is a diagram illustrating the first exemplary embodiment of the present disclosure.

FIG. 2 illustrates a state in which the coupling stopper 9 is inserted into the hole of the corresponding coupling pin 12 and advanced to the position at which the coupling stopper 9 can be coupled to the coupling pin 12 (in the arrow X1 direction in FIG. 2) in a state in which the mold clamping force from the molding apparatus 22 described with reference to FIGS. 1A and 1B acts on the mold A. Specifically, the controller 42 of the control unit 40 (refer to FIGS. 11A and 11B) outputs an instruction to the coupling portion drive unit and advances the coupling stopper 9 by operating the coupling portion drive unit (the air cylinder 8). At this time, there is a gap between the coupling stopper 9 and the coupling pin 12. This gap can prevent the coupling stopper 9 and the coupling pin 12, both of which serve as holding mechanisms, from being firmly fixed to each other and causing operational failure even if the coupling stopper 9 and the coupling pin 12 repeat sliding or coupling operations.

Figure 3:
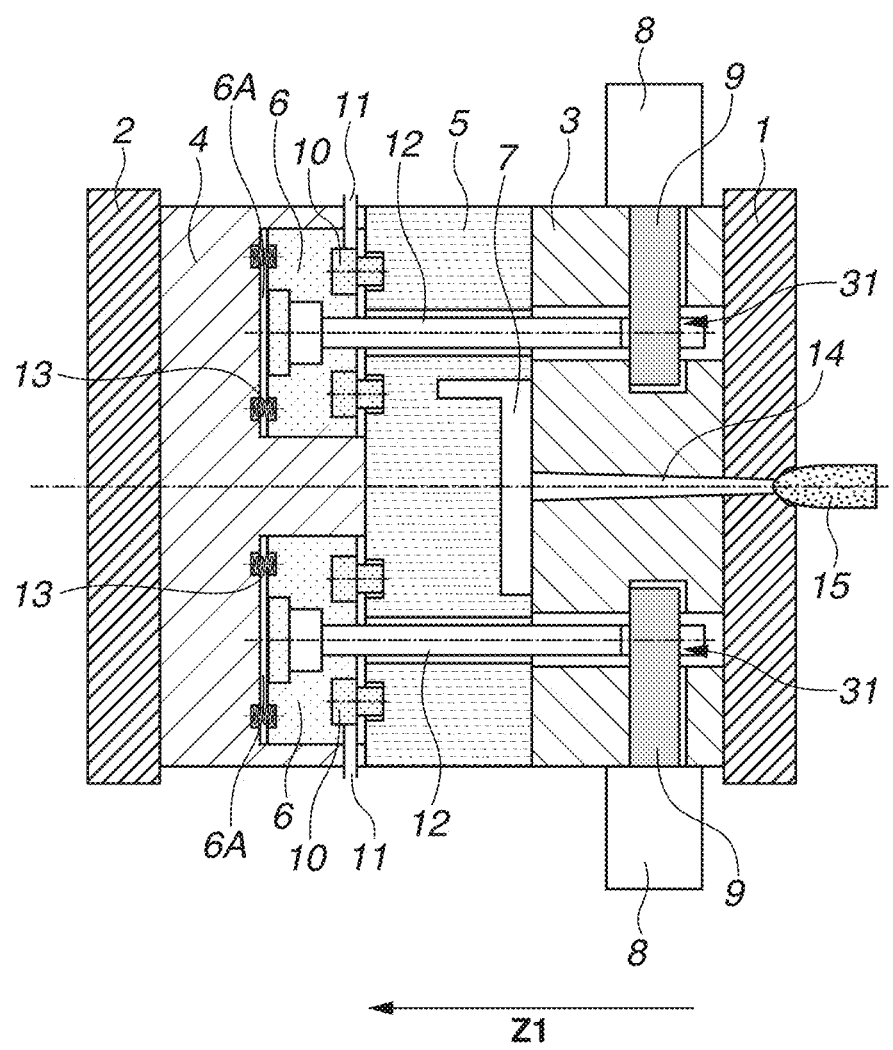
FIG. 3 is a diagram illustrating the first exemplary embodiment of the present disclosure.

FIG. 3 illustrates a state in which each block 6 is moved in a state in which the mold clamping force from the molding apparatus 22 described in conjunction with FIGS. 1A and 1B acts on the mold A, and the coupling stoppers 9 illustrated in FIG. 2 are advanced. Specifically, the controller 42 of the control unit 40 (refer to FIGS. 11A and 11B) outputs a signal to the coupling portion movement units and operates the coupling portion movement units (the hydraulic cylinders 10). This operation moves each block 6 arranged inside the movable mold in a direction in which the thickness of the corresponding space 6A formed between the block 6 and the second mold plate 5 of the movable mold decreases. Each coupling pin 12 attached to the corresponding block 6 is also moved in a direction to the mounting plate 2 of the movable mold (the arrow Z1 direction in FIG. 3) by this movement. Each coupling pin 12 and the corresponding coupling stopper 9 are then coupled and form the coupling portion 31, and a force is applied to the coupling stopper 9 from the coupling pin 12 in a direction toward the movable mold. Further, forces from the hydraulic cylinders 10 are applied to the stationary mold in the direction toward the movable mold (the mold closing direction) by the coupling stoppers 9. The thickness of each space 6A formed between the corresponding block 6 and the second mold plate 5 of the movable mold is made larger than a total thickness of a gap between the corresponding coupling stopper 9 and coupling pin 12, and an amount (an extension margin) of deformation of the coupling pin 12 occurring from application of the mold closing force. This arrangement can prevent the blocks 6 from coming into close contact with the second mold plate 5 of the movable mold. It is desirable that the thickness of the spaces 6A is 0.1 mm or more. The mold A can generate the mold closing force that is not the mold clamping force form the injection molding apparatus 22, but an independent mold clamping force of the mold A itself, thus maintaining (self-maintaining) the mold clamping force (the mold closing force) by the mold A itself alone. This mold closing force can prevent a gap from appearing between the stationary mold and the movable mold of the mold A (a mold closing state is maintainable), so that if the mold clamping force from the molding apparatus 22 is released (if the mold A is removed from the molding apparatus 22), the mold closing state is maintainable. In other words, no gap is generated between the stationary mold and the movable mold of the mold A.

An actuation of the air cylinders 8 for advancing the coupling stoppers 9 illustrated in FIG. 2 to the positions at which the coupling stoppers 9 can be coupled to the coupling pins 12 and an actuation of the hydraulic cylinders 10 illustrated in FIG. 3 may be performed at any time as long as the mold clamping force from the molding apparatus 22 is being generated in the mold A. Injection is then performed from the injection nozzle 15 in a state in which the mold clamping force from the molding apparatus 22 is generated in the mold A (an injection process). In the injection process, a molten resin is injected from the injection nozzle 15 via the sprue 14 into the cavity 7 formed by the mold plate 3 of the stationary mold and the first mold plate 4 of the movable mold.

After the injection process, the mold A is removed from the molding apparatus 22 in a state in which the mold closing force as the independent mold clamping force of the mold A itself is being generated in the mold A. The mold A is then placed in a state of being removed from the molding apparatus 22 until the molten resin injected into the cavity 7 is cooled to a predetermined temperature. The predetermined temperature is a temperature at which the molten resin injected into the cavity 7 is cooled and solidified and does not deform if the molten resin is removed from the mold.

Figure 4:
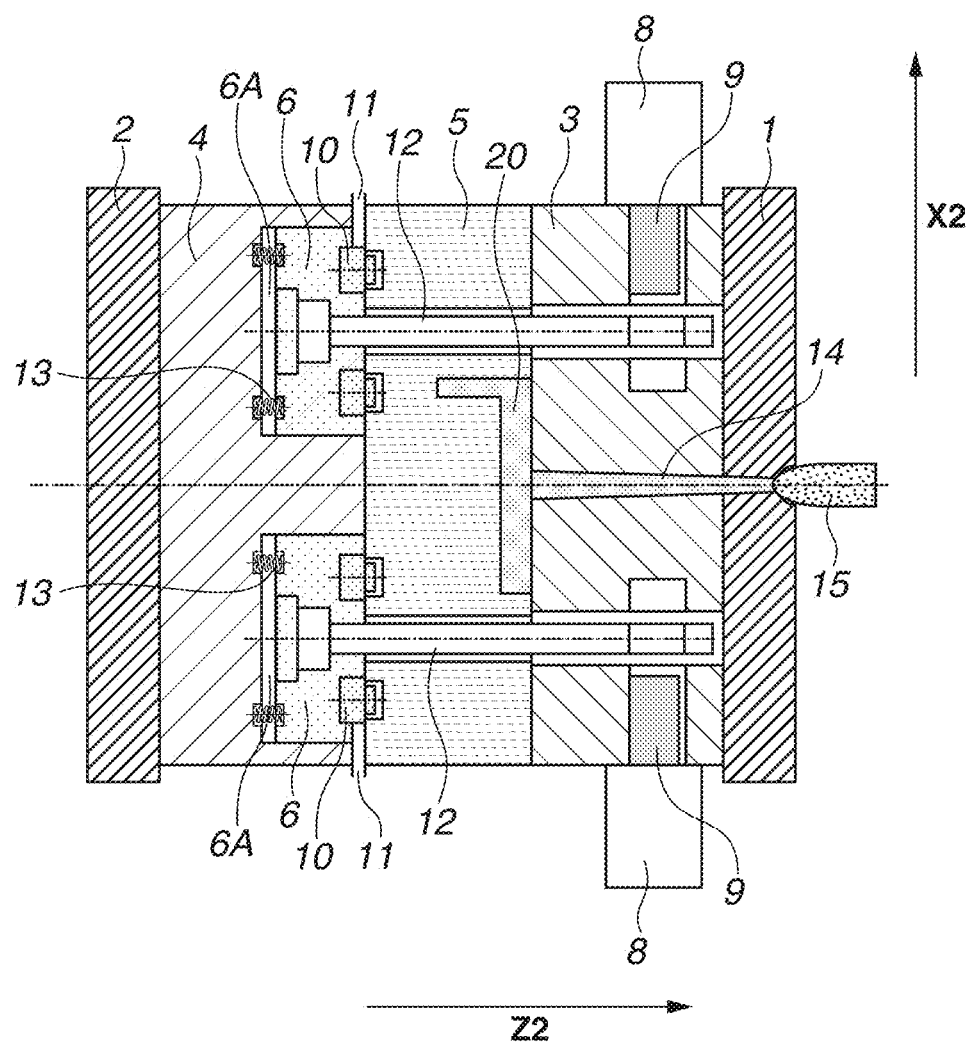
FIG. 4 is a diagram illustrating the first exemplary embodiment of the present disclosure.

Next, the mold A is attached to the molding apparatus 22 again, and the hydraulic cylinders 10 are released to start opening the mold. The blocks 6 are then moved by the springs 13 in a direction in which the respective spaces 6A formed between the corresponding block 6 and the second mold plate 5 of the movable mold return to original thicknesses. In conjunction with the movement, coupling of the coupling pins 12 and the coupling stoppers 9 is released (the contact between the coupling pins 12 and the coupling stoppers 9 is released). After the coupling is released, the air cylinder 8 is operated to retract the coupling stopper 9 to the position at which the mold opening operation is performable (in the arrow X2 direction in FIG. 4). FIG. 4 illustrates this state.

Figure 5:
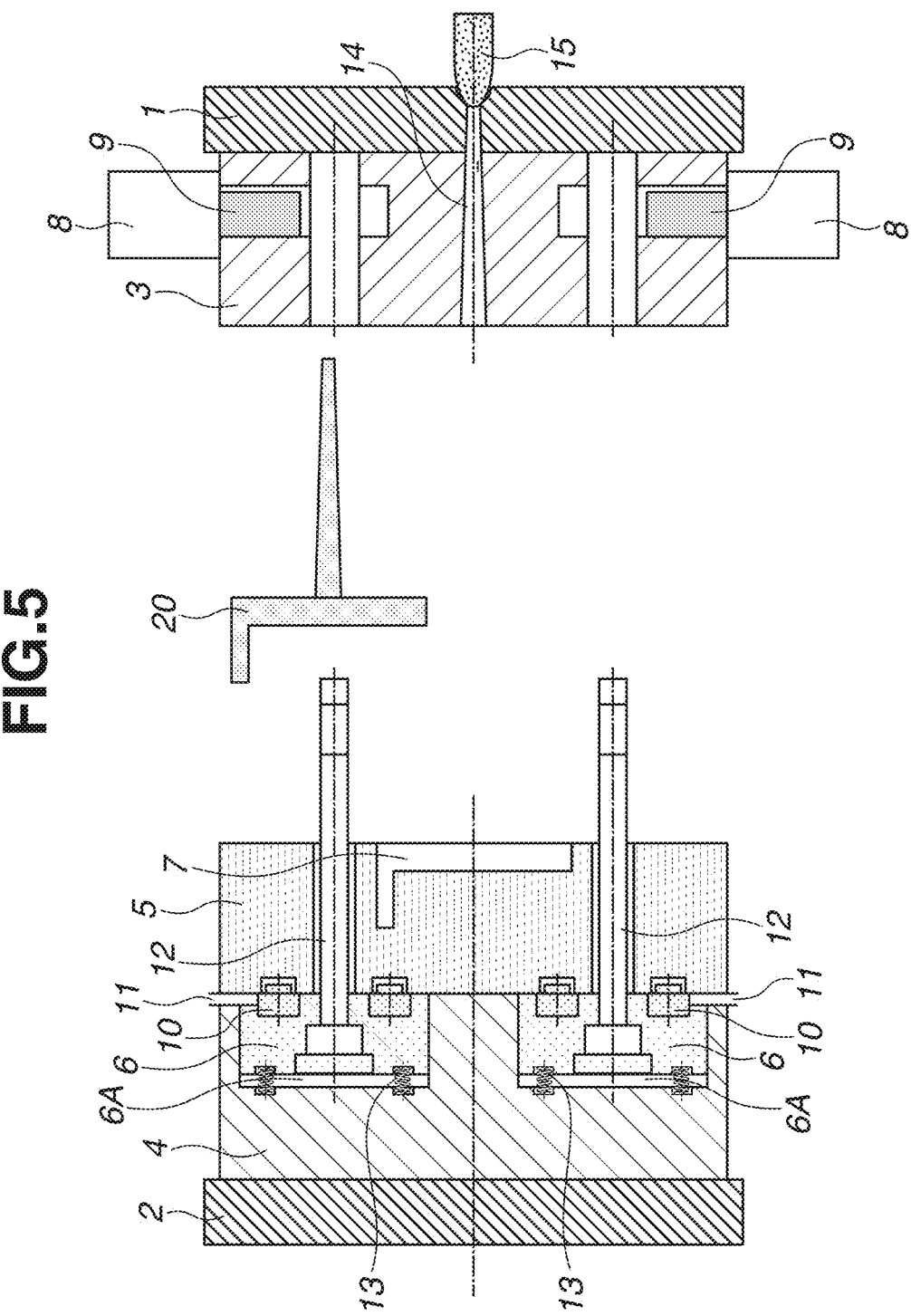
FIG. 5 is a diagram illustrating the first exemplary embodiment of the present disclosure.
Figure 6:
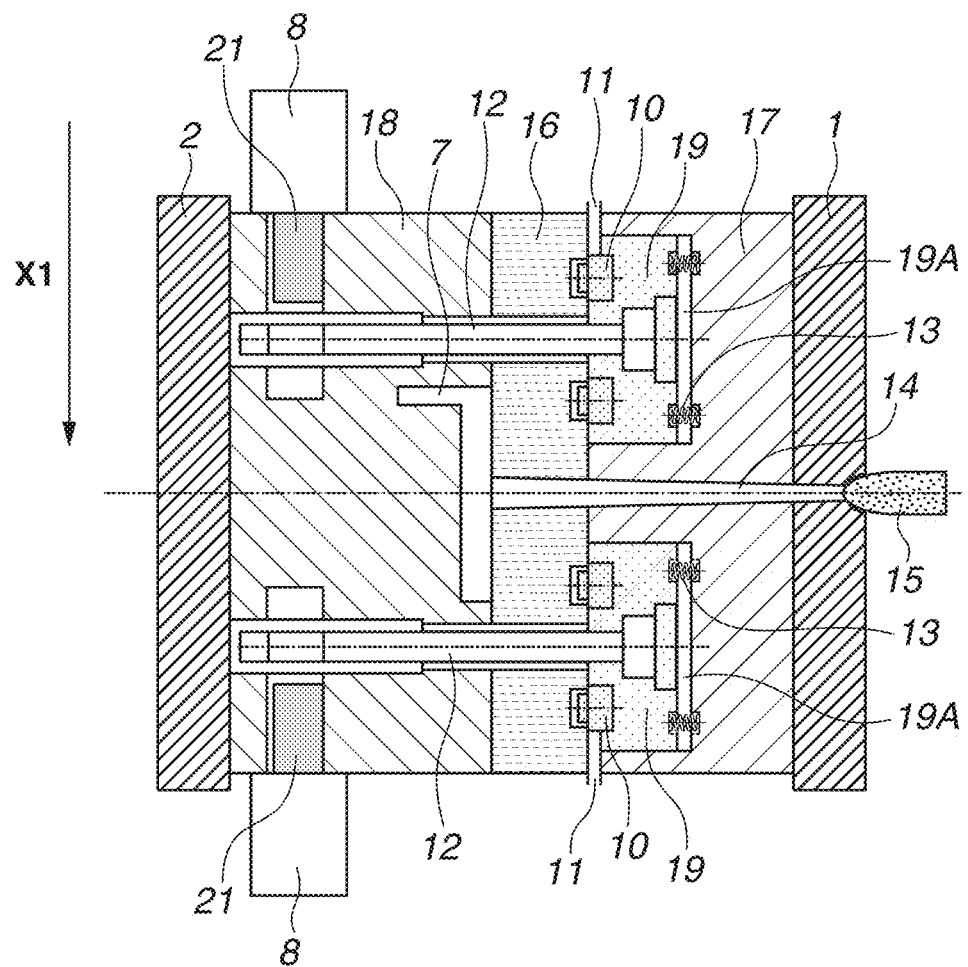
FIG. 6 is a diagram illustrating a second exemplary embodiment of the present disclosure.
Figure 7:
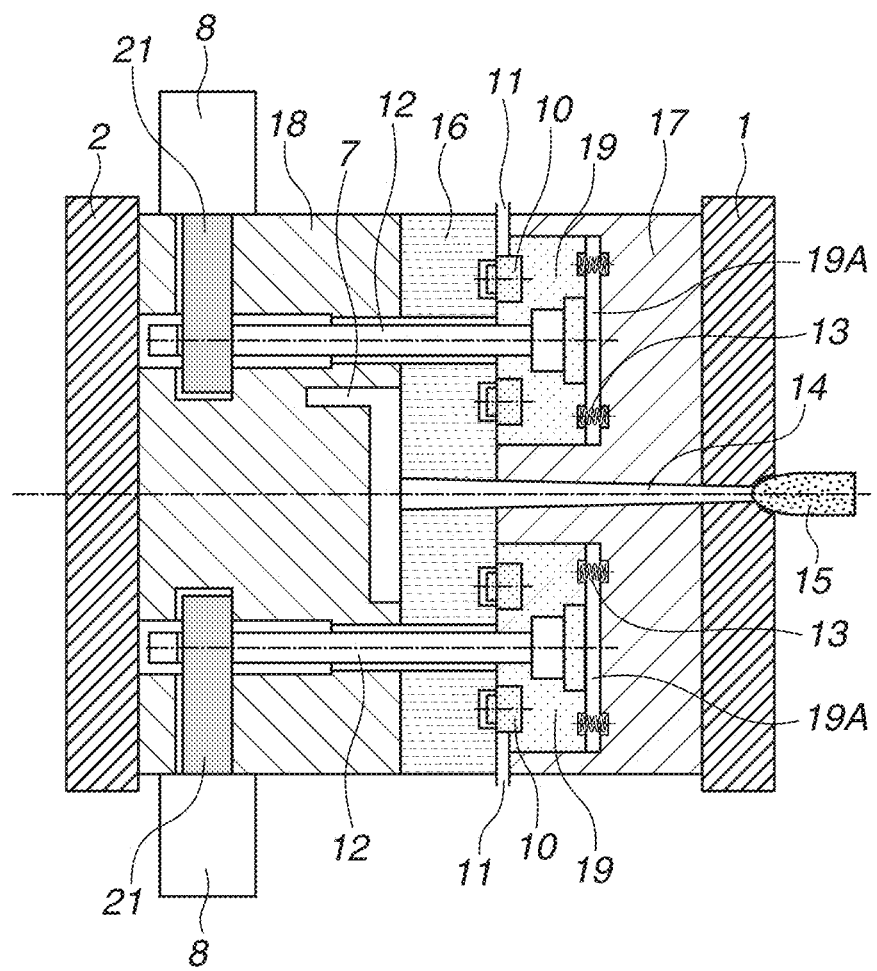
FIG. 7 is a diagram illustrating the second exemplary embodiment of the present disclosure.
Figure 8:
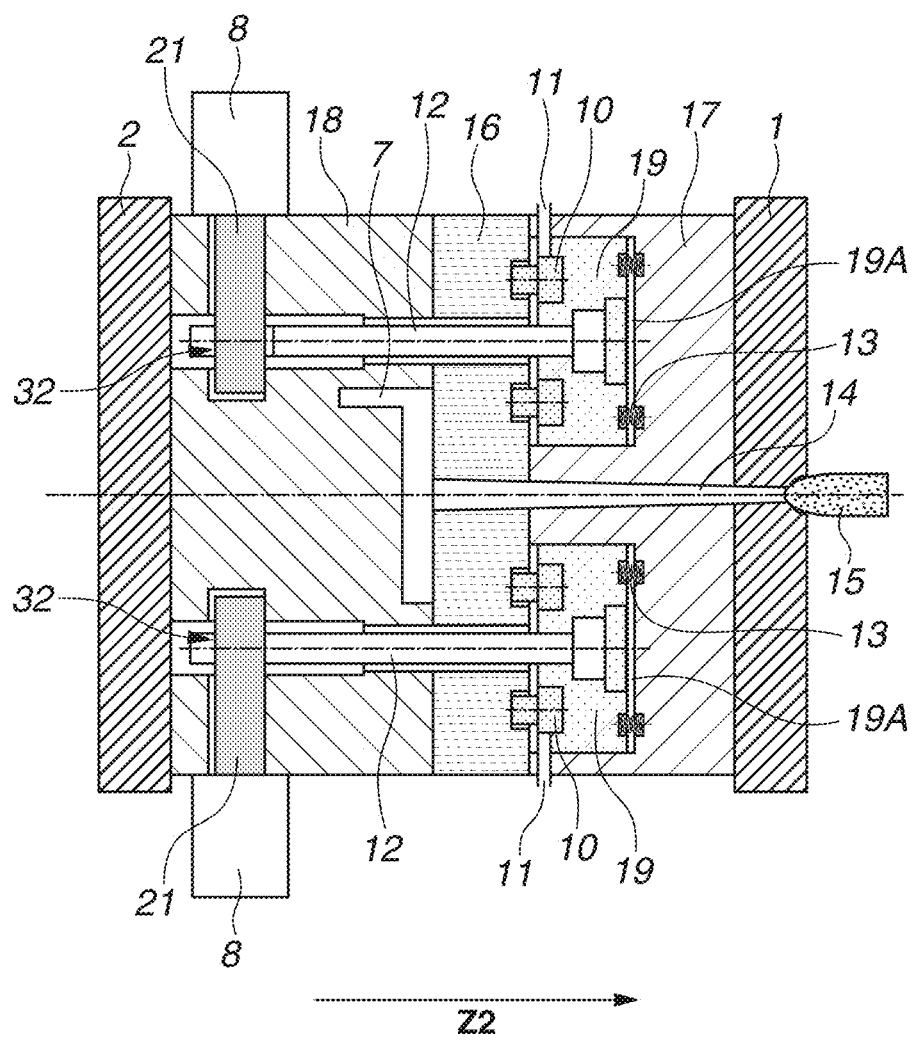
FIG. 8 is a diagram illustrating the second exemplary embodiment of the present disclosure.
Figure 9:
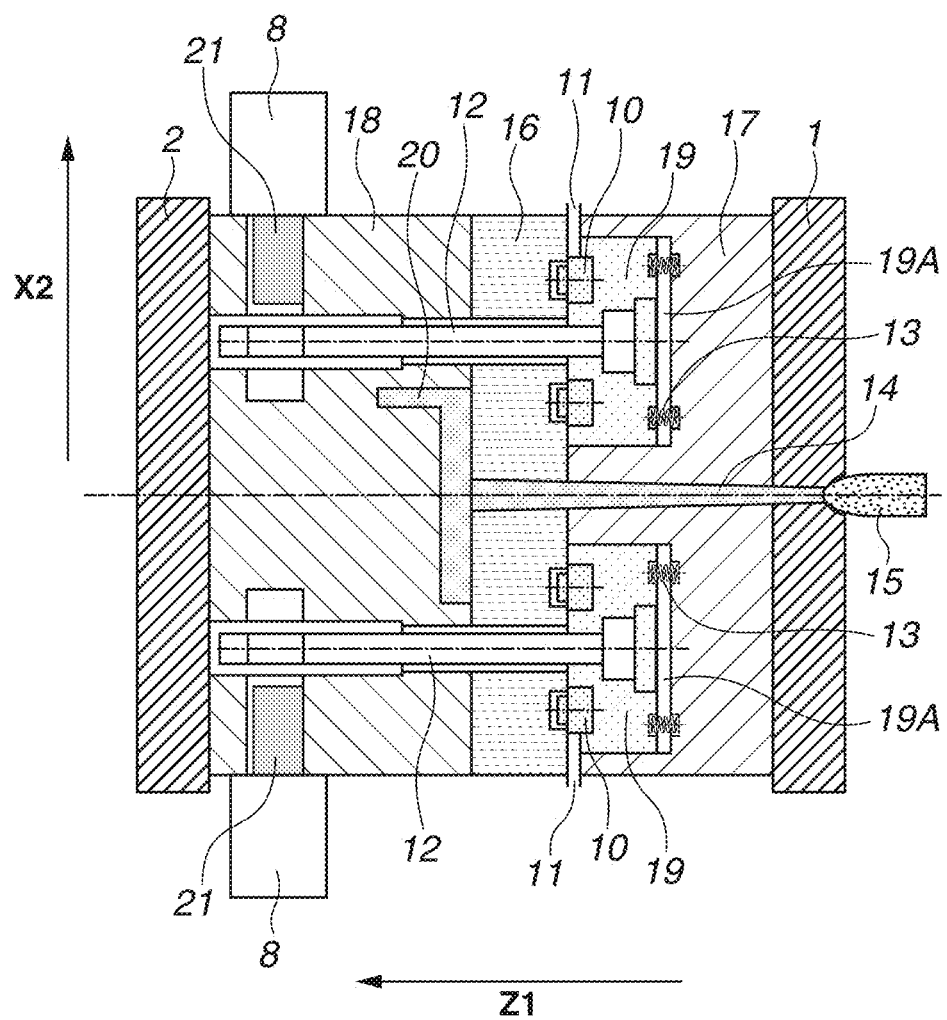
FIG. 9 is a diagram illustrating the second exemplary embodiment of the present disclosure.
Figure 10:
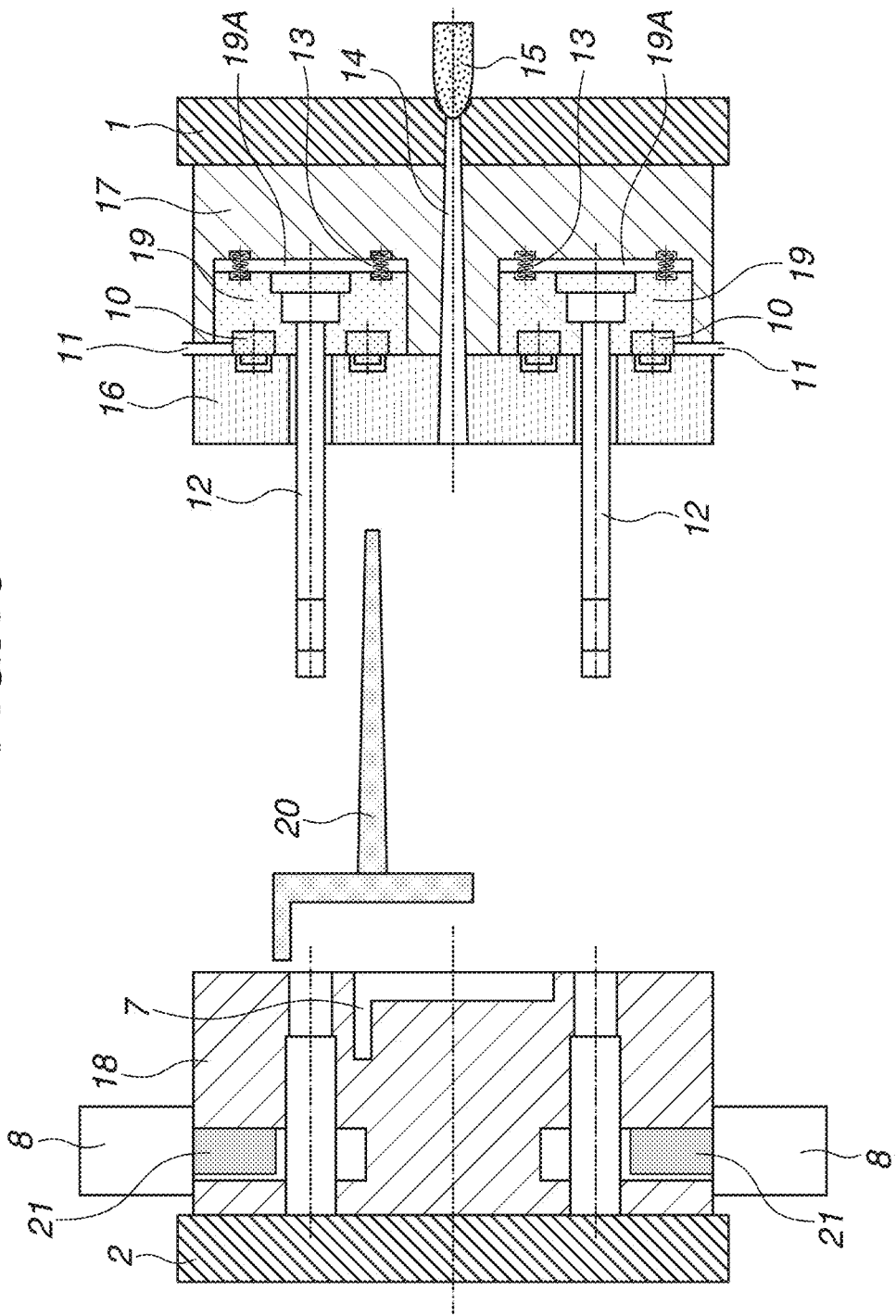
FIG. 10 is a diagram illustrating the second exemplary embodiment of the present disclosure.

Next, the retracting of the movable mold to a set position completely separates the stationary mold and the movable mold (a state in which the mold opening operation is completed). The resin molded product 20 obtained by cooling and solidifying the molten resin in the cavity 7 is then ejected and pushed out by an ejector rod to a space which appears in a gap between the coupling pins 12 and the mold plate 3 of the stationary mold, and taken out from the cavity 7. FIG. 5 illustrates this state. At the time of ejection, the molded product 20 may be ejected from a stationary side using a tension link connected to an ejector plate provided in the mold plate on the stationary side without using the ejector rod.

Figure 13A:
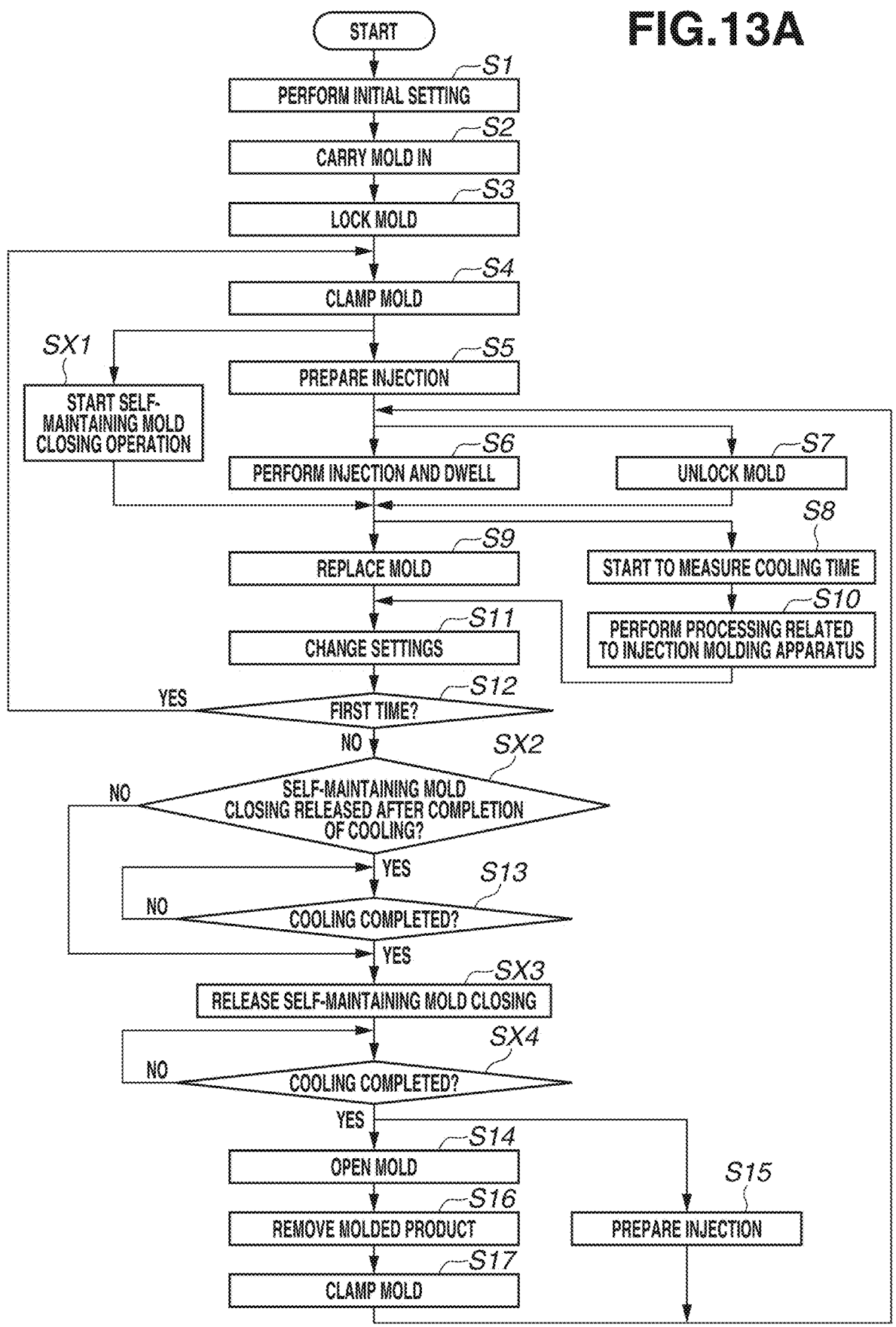

Next, an example of operations of the injection molding system will be described with reference to FIGS. 1A, 1B, 2 to 5, 11A, 11B, 13A, and 13B. FIG. 13A is a flowchart illustrating an example of processing executed by the controller 41.

In step S1 in FIG. 13A, the controller 41 performs an initial setting. In step S1, operation conditions of the injection molding apparatus 22 are registered for each of the molds A and B illustrated in FIGS. 11A and 11B. Examples of the operation conditions include a resin amount per injection, a temperature, an injection speed, the mold clamping force, and an initial value of a position of a movable platen 222 with respect to a tie bar. These conditions may be the same or different for the mold A and the mold B. Since the mold A is used in a first molding operation, first, the conditions related to the mold A are automatically set as the operation conditions. Heating an injection cylinder and first measurement of plasticization of the resin are started.

In step S2 in FIG. 13A, the mold A is conveyed into an inside of the injection molding apparatus 22. A gap between a stationary platen 221 and the movable platen 222 is set slightly wider than a thickness of the mold A. Subsequently, the mold A is carried in to a molding operation position by a conveyance apparatus or the like. When carrying-in is completed, the conveyance apparatus transmits a signal indicating completion of carrying-in to the controller 41. In response to receiving the signal indicating completion of carrying-in, the controller 41 brings the stationary platen 221 and the movable platen 222 into close contact with the mold A. At this time, it is not necessary to generate the mold clamping force such as one to be generated during molding. An inside of the injection molding apparatus 22 described here means the molding operation position and also a space between the stationary platen 221 and the movable platen 222. An outside of the injection molding apparatus 22 means an outside of the molding operation position and an outside of the space between the stationary platen 221 and the movable platen 222.

In step S3 in FIG. 13A, the mold A is locked to each of the stationary platen 221 and the movable platen 222.

In step S4 in FIG. 13A, the stationary platen 221 and the movable platen 222 perform mold clamping of the mold A. Next, an operation in step SX1 and operations in steps S5 to S7 in FIG. 13A are performed in parallel. In step SX1 in FIG. 13A, the controller 41 transmits an instruction signal to the controller 42 to operate the air cylinders 8 to advance the respective coupling stoppers 9 to the position at which the coupling stopper 9 can be coupled to the corresponding coupling pins 12. The hydraulic cylinders 10 are operated to move the blocks 6 attached inside the movable mold in the direction in which the thickness of each space 6A formed between the respective blocks 6 and the second mold plate 5 of the movable mold decreases. The coupling pins 12 attached to the blocks 6 are each coupled to the corresponding coupling stopper 9, and the mold clamping force (the mold closing force) can be maintained by the mold alone (self-maintaining mold closing). At this time when the self-maintaining mold closing is completed, the mold can be replaced. A self-maintaining mold closing operation may be started at any timing during the operations in steps S4 to S9 in FIG. 13A as long as the self-maintaining mold closing can be completed within a period from the time of completion of the operation in step S4 to the time of replacement of the mold in step S9. Thus, in the self-maintaining of the mold closing, the mold can be replaced without the occurrence of a waiting time.

In step S5 in FIG. 13A, the controller 41 prepares injection to the mold A.

Next, the operations in steps S6 and S7 in FIG. 13A are performed in parallel.

In step S6, injection and dwell of the molten resin are performed. In detail, the cavity 7 in the mold A is filled with the molten resin through the injection nozzle 15, and the resin is further pushed in at a high pressure to compensate for a volume reduction resulting from solidification of the resin. In the operation in step S6, the controller 41 causes a sensor to measure an actual mold clamping force. The mold A thermally expands as a temperature of the mold A gradually rises during molding, and accordingly, a difference may arise between an initial mold clamping force and the mold clamping force after a while. Thus, the mold clamping force in the next mold clamping can be corrected based on a result of the measurement performed by the sensor. The mold clamping force is adjusted by a position adjustment of the movable platen 222. The mold clamping force is adjusted through adjustment of the initial value of the position of the movable platen 222 with respect to the tie bar based on the result of the measurement performed by the sensor as described above, thus enhancing the accuracy of the mold clamping force. The position adjustment of the movable platen 222 with respect to the tie bar can be performed at any timing (e.g., at a timing of any of steps SX1, S9, SX2, and S14 to S16 in the flowchart in FIG. 13A).

In step S7, the mold A is unlocked with respect to the stationary platen 221 and the movable platen 222. Unlocking the mold A may take a certain time (e.g., several seconds). Unlocking the mold A is performed in parallel with injection and dwell in step S6, and thus replacement of the mold in step S9 can be performed immediately after completion of the operation in step S6. The mold A is in a mold clamping state, so that the mold A does not fall, or a relative position between the mold plate 3 of the stationary mold and the first mold plate 4 of the movable mold is not shifted even if the lock with the platens 221 and 222 is released.

Thus, productivity can be improved. Specifically, for example, it is assumed that an interval for taking out the molded product is 18 seconds, and unlocking the mold in step S7 takes 2.6 seconds in a configuration in which the operation in step S7 is performed after the operation in step S6, unlike the present exemplary embodiment. In such a case, 4800 shots of molded products can be produced per day. In contrast to this, in a case where unlocking the mold A can be completed during the operation in step S6 by performing the operations in steps S6 and S7 in parallel as in the present exemplary embodiment, the interval for taking out the molded product can be shortened to 15.4 seconds. Thus, 5610 shots of molded products can be produced per day, and the productivity can be improved by 16.9%.

In some cases, for example, a fluid actuator is used as a drive source for locking the mold A with respect to the stationary platen 221 and the movable platen 222. As a countermeasure against a loss of a fluid pressure due to a power failure or trouble in the apparatus, a spring for holding the mold is provided in some cases so that the mold A does not fall off from the injection molding apparatus 22. However, if such a spring exists, it is necessary to release the lock against an urging force of the spring, and an unlock time tends to be long. In particular, the unlock time becomes longer with a pneumatic actuator. If the mold A becomes larger, a stronger spring will be used, and a fluid actuator with a higher output will be used. However, a high output fluid actuator generally has a large-diameter cylinder, so that a time to release the lock tends to be longer.

In a case where an electromagnetic clamp is used as a drive source for locking the mold A with respect to the stationary platen 221 and the movable platen 222, the mold can be locked in a short time by applying a large current to a coil. However, it is generally necessary to gradually weaken a magnetic force while applying an alternating current to the coil in demagnetization for unlocking, and a certain period of time is required to unlock.

Performing the operations in steps S6 and S7 in parallel as in the present exemplary embodiment enables reduction in a waiting time due to unlocking. The unlocking in step S7 may be started after a start of the injection and before a start of the dwell in step S6. The unlocking in step S7 is completed before completion of the dwell, and a waiting time before a start of subsequent operation (step S9) can be set to zero. In a case where a processing time in step S6 is short, the unlocking in step S7 will be completed after completion of the dwell, but, even in this case, the waiting time can be shortened as compared with the case in which the operation in step S7 is executed after the operation in step S6.

If the operations in steps S6, S7, and SX1 are completed, next, the operations in steps S8 to S10 are performed in parallel. In step S8 in FIG. 13A, the controller 41 starts to measure a cooling time of the molded product in the mold A.

In step S9, the mold is replaced. The controller 41 releases the mold clamping force of the injection molding apparatus 22 to form a gap from which the mold can be replaced by slightly separating the movable platen 222 from the stationary platen 221. The mold is then carried in or out. Details thereof will be described below with reference to FIG. 13B.

In step S10 in FIG. 13A, the controller 41 performs operation related to the injection molding apparatus 22. In step S10, for example, dwelling suck back, a nozzle shut-off, a retraction of the injection molding apparatus 22, and a start of measurement of plasticization for the next injection are performed.

The dwelling suck back and the nozzle shut-off are performed to prevent the molten resin from dripping in a case where the injection nozzle 15 is separated from the mold A. These operations may be performed before the mold self-maintains the mold closing in step SX1 or before the movable platen 222 is slightly separated from the stationary platen 221 in step S9. The dwelling suck back is used to reduce a resin pressure inside the injection molding apparatus 22 and the mold A after the dwell. A retraction position of a screw in the injection molding apparatus 22 in the dwelling suck back may be managed by an absolute position or by a relative position with respect to a position of the screw (not illustrated) after completion of the dwell. The screw may be kept to be retracted until a detection of a drop in the resin pressure measured by a load cell (not illustrated) installed in the injection molding apparatus 22 to a predetermined pressure. The nozzle shut-off is to close a discharge port of the injection nozzle 15, and, for example, the discharge port is closed with a pin. With the operations described above, the resin can be prevented from leaking out.

FIG. 13B illustrates an example of mold replacement operation in step S9. In step S21 in FIG. 13B, separation between the stationary platen 221 and the movable platen 222 is started. Thus, the stationary platen 221 and the movable platen 222 are slightly separated, and a gap from which the mold can be replaced is formed. In the present exemplary embodiment, the operation in step S22 is started before the separation operation is completed.

In step S22 in FIG. 13B, carrying out the mold A, which is on the inside of the injection molding apparatus 22, and carrying in the mold B, which is on the outside of the injection molding apparatus 22 are started. In general, no matter what control method is used, it takes some time for the movement of the mold to converge to a target after approaching a movement amount or an absolute position as the target. Further, the movable platen 222, which needs to receive a high mold clamping force, is relatively heavy in general, so that it is difficult for the movable platen 222 to suddenly move or stop in the operations from movement to stoppage. If the movement of the movable platen 222 is mostly completed, the gap from which the mold can be replaced is formed. According to the present exemplary embodiment, replacement of the mold A is started before separation between the stationary platen 221 and the movable platen 222 is completed, and thus the productivity can be improved. Accordingly, for example, a waiting time of about 0.1 to 0.3 seconds can be reduced for each replacement of the mold. Assuming that the reduction time is 0.2 seconds each time and the molds are replaced 6000 times a day, the waiting time of 20 minutes can be reduced per day.

A timing for starting carrying out the mold A in step S22 is, for example, a timing when the movable platen 222 comes to a position about 0.5 to 2 mm before completion of the movement, but it can be appropriately set based on a prior experiment and the like. Similarly, a timing for starting carrying in the mold B, which is on the outside the apparatus, is a timing when the movable platen 222 comes to the position about 0.5 to 2 mm before completion of the movement, but it can be appropriately set based on a prior experiment and the like. The timing for carrying in and out the mold B may differ depending on the mold and the like, so that a setting may be freely changed.

In step S23 in FIG. 13B, separation between the stationary platen 221 and the movable platen 222 is completed (movement of the movable platen 222 is completed). Completion of the separation between the stationary platen 221 and the movable platen 222 may be monitored, and replacement of the mold may be stopped in a case where an abnormality is recognized.

Examples of the abnormality include a case where the movable platen 222 does not reach a target position, and a case where the conveyance apparatus is overloaded.

In step S24 in FIG. 13B, movement of the movable platen 222 is started to start to bring the stationary platen 221 and the movable platen 222 closer to each other. Here, the productivity can also be improved by starting to bring the stationary platen 221 and the movable platen 222 closer to each other during the movement before completion of carrying-in of the mold B. A timing for starting movement of the movable platen 222 is, for example, a timing when the mold B to be carried in comes to a position about 0.5 to 3 mm before completion of the movement, but it can appropriately be set based on a prior experiment and the like. A timing for starting movement of the movable platen 222 with respect to the position of the mold B to be carried in may differ depending on a mold closing speed, performance of the conveyance apparatus, a weight of the mold B, and the like, so that a setting may be freely changed.

In step S25 in FIG. 13B, carrying out the mold A, which is on the inside of the injection molding apparatus 22 and carrying in the mold B, which is on the outside of the injection molding apparatus 22 are completed. In step S26, bringing the stationary platen 221 and the movable platen 222 closer to each other is completed (the movement of the movable platen 222 is completed). The stationary platen 221 and the movable platen 222 come into close contact with the mold B carried into the injection molding apparatus 22. At this time, it is not necessary to generate the mold clamping force such as one that is generated during molding. Completion of bringing the stationary platen 221 and the movable platen 222 closer to each other may be monitored, and replacement of the mold may be stopped in a case where an abnormality is recognized.

Examples of the abnormality include a case where the movable platen 222 does not reach a target position, and a case where the conveyance apparatus is overloaded. In step S27, the mold B carried into the injection molding apparatus 22 is locked to each of the stationary platen 221 and the movable platen 222. With the foregoing operations, the mold replacement operation in step S9 is completed.

Repeating of the above-described operations enables molded products having an excellent appearance quality and dimensional quality to be efficiently manufactured in a short time. Furthermore, products including the molded products which have the excellent appearance quality and dimensional quality and are efficiently molded in a short time can be manufactured.

A second exemplary embodiment will be described with reference to FIGS. 6 to 10. According to the first exemplary embodiment, an example has been described in which the coupling pins 12 are arranged on the stationary mold, and the blocks 6 are arranged on the movable mold. According to the second exemplary embodiment, an example will be described in which the coupling pins 12 are arranged on the movable mold, and the blocks 6 are arranged on the stationary mold. In FIGS. 6 to 10, members having the same functions as those in FIGS. 1A, 1B, and 2 to 5 are denoted by the same reference numerals, and detailed descriptions thereof are omitted.

In FIGS. 6 to 10, the mold includes the mounting plate 1 of the stationary mold, the mounting plate 2 of the movable mold, a first mold plate 16 and a second mold plate 17 of the stationary mold, and a mold plate 18 of the movable mold. The stationary mold of the mold includes the mounting plate 1, the first mold plate 16, and the second mold plate 17. The movable mold of the mold includes the mounting plate 2 and the mold plate 18. The mold includes blocks 19 provided inside the stationary mold, spaces 19A each formed between the respective blocks 19 and the second mold plate 17 of the stationary mold, and the cavity 7 into which the molten resin flows from the molding apparatus 22 (refer to FIGS. 11A and 11B). The mold further includes the air cylinders 8 and coupling stoppers 21 each of which is inserted into the corresponding coupling pin 12 to form a coupling portion 32 (refer to FIG. 8) for coupling the movable mold to the stationary mold. The coupling stoppers 21 are each driven by the corresponding one of the air cylinders 8 to perform coupling and uncoupling of the stationary mold and the movable mold. The mold includes the hydraulic cylinders 10 and the hydraulic hoses 11 for supplying and discharging oil for driving the hydraulic cylinders 10. The hydraulic cylinders 10 each serve as the coupling portion movement unit for moving the respective coupling portions 32 (refer to FIG. 8) by moving the corresponding block 19. The coupling pins 12 attached to the respective blocks 19 each have a hole into which the corresponding coupling stopper 21 is inserted. The mold further includes the springs 13 and the sprue 14. The injection nozzle 15 is included in the molding apparatus 22 (refer to FIGS. 11A and 11B). The mounting plates 1 and 2, the mold plates 16, 17, and 18, the blocks 19, the air cylinders 8, the coupling stoppers 21, the hydraulic cylinders 10, the coupling pins 12, the springs 13, and the sprue 14 are each a component (a member) of the mold A (or the mold B). The coupling stoppers 21 and the coupling pins 12, which are included in a coupling unit and form the coupling portions 32, can be referred to as coupling components or coupling members.

The hydraulic cylinders 10 and the hydraulic hoses 11 are attached to the blocks 19 attached inside the stationary mold as the coupling portion movement units which move the blocks 19 and the coupling pins 12 toward the mounting plate 1 (arrow Z2 direction in FIG. 8) of the stationary mold. In other words, the movement portion drive units move the coupling portions (32 in FIG. 8) of the coupling pins 12 and the coupling stoppers 21 in the mold closing direction (the arrow Z2 direction in FIG. 8). The coupling portion movement units may include the springs 13 for moving the coupling portions 32 in the mold opening direction (arrow Z1 direction in FIG. 9) by moving the blocks 19 and the coupling pins 12 toward the mounting plate 2 of the movable mold. Possible drive sources for the coupling portion movement units are a pneumatic or electric type in addition to a hydraulic one, but it is desirable to select the hydraulic drive source in order to generate a large pressure equivalent to the mold clamping force.

The mold closing mechanism according to the present exemplary embodiment includes the coupling portions for coupling the stationary mold and the movable mold, the coupling units for coupling and uncoupling the stationary mold and the movable mold, and the coupling portion movement units for pressing (moving) the coupling portion in the mold closing direction. According to the present exemplary embodiment, the respective coupling portion corresponds to a contact portion of the corresponding coupling pin 12 and coupling stopper 21, and the respective coupling unit corresponds to the respective coupling pin 12, the respective coupling stopper 21, and the respective air cylinder 8. The respective coupling portion movement unit corresponds to the respective block 19, the respective hydraulic cylinder 10 (the hydraulic hose 11), and the respective spring 13.

A total of four coupling pins 12 are arranged at the four corners inside the second mold plate 17 of the stationary mold. Two hydraulic cylinders 10 are attached to both sides of each coupling pin 12, namely, a total of eight hydraulic cylinders 10 are attached. The hydraulic cylinders 10 are each connected to an external hydraulic pump (not illustrated) via the respective hydraulic hoses 11.

According to the present exemplary embodiment, the example has been described in which the total of four coupling pins 12 are arranged. However, the number of coupling pins 12 is not limited to this example. For example, it is desirable to arrange two or more and 32 or less pieces of the coupling pins 12, more desirably, 3 or more and 16 or less. Such an arrangement enables a uniform mold closing force to be generated in the mold A even in a state in which the mold A is removed from the molding apparatus 22. If the number of coupling pins 12 is large, a larger mold closing force can be obtained. However, if the number of coupling pins 12 is too large, it is necessary to reduce a size of each mold closing mechanism, so that the mold closing force is weakened conversely, resulting in an increase in an apparatus cost. The example has been described in which two hydraulic cylinders 10 are arranged for each coupling pin 12, but the present exemplary embodiment is not limited to this example. The number of hydraulic cylinders 10 may be one as long as a pressure sufficient to move the coupling portions can be generated. The number of hydraulic cylinders 10 may be more than two, but the apparatus cost increases.

The coupling stopper 21 is attached to the corresponding air cylinder 8 attached to the mold plate of the movable mold, and the coupling stopper 21 can be advanced to a position at which the corresponding coupling stopper 21 is inserted into the hole of the corresponding coupling pin 12 (in arrow X1 direction in FIG. 6) by operating the corresponding air cylinder 8. The coupling stopper 21 can also be retracted to a position at which the mold opening operation can be performed (in arrow X2 direction in FIG. 9). The coupling stopper 21 is inserted into the hole of the coupling pin 12, so that the mold can be removed from the molding apparatus 22 in a state in which the stationary mold and the movable mold are not opened by a predetermined distance or more.

However, with this configuration alone, a gap appears between the stationary mold (the first mold plate 16 of the stationary mold) and the movable mold (the mold plate 18 of the movable mold). If such a gap appears, resin which is not sufficiently solidified may leak out, and a required accuracy for the molded product may not be obtained. Thus, the hydraulic cylinders 10 are operated to move the blocks 19 in a direction of approaching the mounting plate 1 of the stationary mold (the arrow Z2 direction in FIG. 8). Thus, the coupling pins 12 are also moved in the direction of approaching the mounting plate 1 of the stationary mold (the arrow Z2 direction in FIG. 8) together with the blocks 19. This movement brings the coupling pins 12 and the coupling stoppers 21 into contact with each other to form the coupling portions 32. The coupling stoppers 21 are moved in the direction of approaching the mounting plate 1 of the stationary mold (the arrow Z2 direction in FIG. 8) by the coupling portions 32, and thus the movable mold can be drawn toward the stationary mold. In other words, the coupling portions 32 are moved in the mold closing direction, and thus it is possible to prevent a gap from being appearing between the movable mold (the mold plate 18 of the movable mold) and the stationary mold (the first mold plate 16 of the stationary mold). Specifically, operating of the hydraulic cylinders 10 moves the blocks 19 and the coupling pins 12 are moved in a direction in which the spaces 19A formed between the blocks 19 and the second mold plate 17 of the stationary mold become narrower (a direction in which distances between the blocks 19 and the second mold plate 17 of the stationary mold become shorter). The hydraulic cylinders 10 are operated in a state in which the coupling stoppers 21 are advanced to the positions at which the coupling stoppers 21 can be coupled to the coupling pins 12. The respective coupling stopper 21 then comes into contact with and is coupled to the corresponding coupling pins 12, which enables a force generated by the hydraulic cylinders 10 to act as a force in the mold closing direction of the movable mold (the arrow Z2 direction in FIG. 8). Thus, the mold closing force can be generated between the movable mold and the stationary mold. Accordingly, even if the mold is removed from the molding apparatus 22, it is possible to prevent a gap from appearing between the movable mold (the mold plate 18 of the movable mold) and the stationary mold (the first mold plate 16 of the stationary mold).

The blocks 19 are each configured to return to an original position with the springs 13 in response to the operation of the hydraulic cylinders 10 being released. Specifically, the blocks 19 are moved in the direction in which the distances between the respective blocks 19 and the second mold plate 17 of the stationary mold become longer (in the direction of returning to an original length, i.e., the arrow Z1 direction in FIG. 9) in the space 19A each formed between the respective blocks 19 and the second mold plate 17 of the stationary mold. The spaces 19A are provided in such a manner, so that the mold closing force can be generated by the mold alone even in a case where the mold clamping force of the molding apparatus 22 acts on the mold. If the operation of the hydraulic cylinders 10 is released, the force acting on the stationary mold in the mold closing direction (the arrow Z2 direction in FIG. 8) can be relaxed. As described above, the hydraulic cylinders 10 enables adjustment of the force acting in the mold closing directions of the stationary mold and the movable mold between the coupling stoppers 21 and the coupling pins 12 (the coupling portions 32).

EXAMPLES

Examples according to the present disclosure will be described below.

First Example

A first implementation example will be described below. A molded product was injection molded by a single molding apparatus using two molds according to the first exemplary embodiment as illustrated in FIGS. 11A and 11B.

Specifically, the mold A including the stationary mold including the mounting plate 1 and the mold plate 3 and the movable mold including the mounting plate 2, the first mold plate 4, and the second mold plate 5 was attached to the molding apparatus 22. Next, a predetermined mold clamping force from the molding apparatus 22 and a nozzle touch force of the injection nozzle 15 in a direction toward the mounting plate 1 of the stationary mold were respectively set to F1 and f1. The air cylinders 8 were then operated, and the coupling stoppers 9 were each advanced to the position at which the corresponding coupling stopper 9 can be coupled to the corresponding coupling pin 12. The hydraulic cylinders 10 were then operated, and the blocks 6 attached inside the movable mold were moved in the direction in which a thickness L1 of the respective spaces 6A formed between the corresponding block 6 and the second mold plate 5 of the movable mold decreases. Thus, the respective coupling pins 12 attached to the corresponding block 6 came into contact with the corresponding coupling stopper 9 and formed the coupling portion, and the mold closing force of the mold itself was generated by the movement of the coupling portions in the mold closing direction. Resin was injected for an injection time t1 and the cavity 7 was filled with the resin in this state. In this state, the mold A was dwelled for a dwell time t2, and when the dwell time t2 elapsed, the predetermined mold clamping force from the molding apparatus 22 was released, and the mold A was discharged to the outside of the molding apparatus 22 and cooled for a cooling time t3.

At the same time when the mold A was discharged to the outside of the molding apparatus 22, the mold B was inserted into the molding apparatus 22. With settings of a predetermined mold clamping force applied from the molding apparatus 22 to F2 and a nozzle touch force in the direction of the mounting plate 1 of the stationary mold to f2, resin was injected for an injection time t11 and the cavity 7 was filled with the resin. The air cylinders 8 were operated, and the coupling stoppers 9 were each advanced to the position at which the corresponding coupling stopper 9 can be coupled to the corresponding coupling pin 12. Next, the hydraulic cylinders 10 were operated, and the blocks 6 attached inside the movable mold were moved in the direction in which a thickness L2 of the respective spaces 6A formed between the corresponding block 6 and the second mold plate 5 of the movable mold decreases. Thus, the respective coupling pins 12 attached to the corresponding block 6 formed the coupling portion with the corresponding coupling stopper 9, and the mold closing force of the mold itself was generated by the movement of the coupling portions in the mold closing direction. The mold B was dwelled for a dwell time t21 in this state. When the dwell time t21 elapsed, the predetermined mold clamping force from the molding apparatus 22 was released, and the mold B was discharged to the outside of the molding apparatus 22 and cooled for a cooling time t31. At the same time that the mold B was discharged to the outside of the molding apparatus 22, the mold A was inserted into the molding apparatus 22, the operation of the hydraulic cylinders 10 was released, and the coupling between the coupling pins 12 and the coupling stoppers 9 was released. The blocks 6 were then moved by the springs 13 in a direction in which the thickness L1 of the respective spaces 6A formed between the corresponding block 6 and the second mold plate 5 of the movable mold increases. Next, the air cylinders 8 were operated, and the respective coupling stoppers 9 were retracted to a position at which the mold opening operation can be performed, and the movable mold was retracted to a set retraction limit position. Thus, the mold opening process was completed. After completion of the mold opening process, the resin molded product 20 was ejected by the ejector rod and taken out from the molding apparatus 22 via the space formed in the gap between the coupling pins 12 and the first mold plate 4 of the movable mold. After taking out the resin molded product 20, the mold was closed, and the molding apparatus 22 generated the predetermined mold clamping force.

The above described molding processes were repeated. Relationships between various forces, times, and thicknesses are indicated in Table 1 described below.

An external appearance of the molded product was visually checked, and the one having no appearance defect is designated as "a", and the one having one or more appearance defects is designated as "b" in Table 1. Further, dimensions of the molded product were measured, and the one having a dimension error of 0.5 mm or less with respect to target dimensions is designated as "a", and the one having the dimension error more than 0.5 mm is designated as "b" in Table 1.

As can be seen from Table 1, the external appearance and the dimensional quality favorably comparing to those in conventional molding can be obtained regardless of the presence or absence of the mold clamping force from the molding apparatus 22, and the improvement in productivity resulting from decrease in a molding cycle was achieved.

Second Example

According to a second example, the air cylinders 8 were operated when the dwell time t2 for the mold A elapsed and when the dwell time t21 for the mold B elapsed, and the respective coupling stoppers 9 were advanced to the position at which the corresponding coupling stopper 9 can be coupled to the corresponding coupling pins 12, in contrast to the first example. Next, the hydraulic cylinders 10 were operated, and the blocks 6 attached inside the movable mold were moved in the direction in which the thickness L2 of the respective spaces 6A formed between the corresponding block 6 and the second mold plate 5 of the movable mold decreases. Thus, the respective coupling pins 12 attached to the corresponding block 6 formed the coupling portion with the corresponding coupling stopper 9, and the coupling portions were moved in the mold closing direction and the mold closing force of the mold itself were generated. The various forces, times, thicknesses, and the like are indicated in Table 1 as described below.

As can be seen from Table 1, if the mold clamping force is applied from the molding apparatus 22, it is possible to achieve the external appearance and the dimensional quality favorably comparing to those in the first example and the improvement of productivity resulting from decrease in the molding cycle, even with a start time for generating the mold closing force of the mold itself changed.

Third Example

According to a third example, the thickness L1 of the respective spaces 6A in the mold A and the thickness L2 of the respective spaces 6A in the mold B were increased from 0.1 mm to 1 mm, in contrast to the first example. The various forces, times, thicknesses, and the like are indicated in Table 1 described below.

If the thickness of the respective spaces 6A is increased, it is possible to achieve the external appearance and the dimensional quality favorably comparing to those of the first example and the improvement in productivity resulting from decrease in the molding cycle, as long as the thickness of each space 6A falls within a range smaller than the thickness of the second mold plate 5 of the movable mold.

First Comparative Example

In contrast to the first example, in a first comparative example, the air cylinders 8 and the hydraulic cylinders 10 of the mold A were not operated, and the resin was injected for the injection time t1 and the cavity 7 was filled with the resin in a state in which the coupling pins 12 attached to the blocks 6 were not coupled to the coupling stoppers 9. The mold A was dwelled for the dwell time t2 in this state. When the dwell time t2 elapsed, the predetermined mold clamping force from the molding apparatus 22 was released, and the mold A was discharged to the outside of the molding apparatus 22 and cooled for the cooling time t3.

At the same time that the mold A was discharged to the outside of the molding apparatus 22, the mold B was inserted into the molding apparatus 22. The predetermined mold clamping force from the molding apparatus 22 was set to F2, and the nozzle touch force in the direction of the mounting plate 1 of the stationary mold were set to f2. Subsequently, with the air cylinders 8 and the hydraulic cylinders 10 not having being operated, resin was injected for the injection time t11 and the cavity 7 was filled with the resin in the state in which the respective coupling pins 12 attached to the corresponding block 6 were not coupled to the corresponding coupling stopper 9.

The mold B was dwelled for the dwell time t21 in this state. When the dwell time t21 elapsed, the predetermined mold clamping force from the molding apparatus 22 was released, and the mold B was discharged to the outside of the molding apparatus 22 and cooled for the cooling time t31. At the same time that the mold B was discharged to the outside of the molding apparatus 22, the mold A was inserted into the molding apparatus 22, the movable mold was retracted to the set retraction limit position, and thus the mold opening process was completed. The resin molded product 20 was ejected by the ejector rod and taken out from the molding apparatus 22 via the space formed in the gap between the coupling pins 12 and the first mold plate 4 of the movable mold. After taking out the resin molded product 20, the mold was closed, and the molding apparatus 22 generated the predetermined mold clamping force.

The above described molding processes were repeated. Various forces, times, thicknesses, and the like in this example are indicated in Table 2 described below. In both of the mold A and the mold B, the stationary mold and the movable mold were separated after releasing the predetermined mold clamping force from the molding apparatus 22, and it was not possible to obtain the molded product having good external appearance and dimensional quality.

Second Comparative Example

In contrast to the first example, in a second comparative example, the hydraulic cylinders 10 of the mold A were released when the dwell time t2 elapsed, and the hydraulic cylinders 10 of the mold B were released when the dwell time t21 elapsed. The various forces, times, thicknesses, and the like in this example are indicated in Table 2 described below.

In both the mold A and the mold B, the stationary mold and the movable mold were separated after releasing the predetermined mold clamping force from the molding apparatus 22, and it was not possible to obtain the molded product having good external appearance and dimensional quality.

Third Comparative Example

Figure 12:
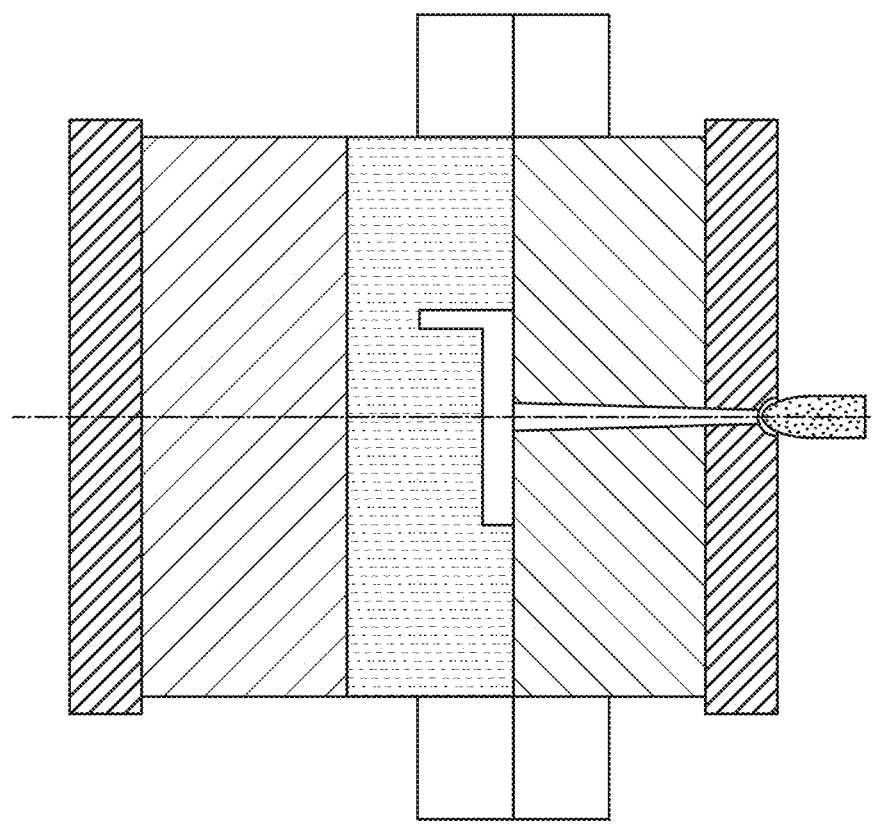
FIG. 12 is a diagram illustrating a third comparative example.

FIG. 12 illustrates a state in which the mold is closed in a case where an injection molding method according to a third comparative example is adopted. In contrast to the first example, in the third comparative example, the mold A and the mold B did not include the mold closing mechanism therein, and magnetic blocks were attached outside of the mold. A total of two pairs of the magnetic blocks were attached such that one pair is attached to the stationary mold and the other pair to the movable mold with a parting line separating the stationary mold and the movable mold as a boundary. The various forces, times, thicknesses, and the like in this example are indicated in Table 2 described below.

A pressure of the resin injected into the cavity 7 was stronger than a magnetic force generated by the magnetic blocks, so that, in both the mold A and the mold B, the stationary mold and the movable mold were separated after releasing the predetermined mold clamping force from the molding apparatus 22. Thus, it was not possible to obtain the molded product having good external appearance and dimensional quality.

Fourth Comparative Example

In contrast to the first example, in a fourth comparative example, molding was performed using only the mold A by a conventional molding method without generating the mold closing force of the mold itself. The various forces, times, thicknesses, and the like in this example are indicated in Table 3 described below.

Although it was possible to obtain the molded product having good external appearance and dimensional quality, it was not possible to realize the improvement in productivity resulting from decrease in the molding cycle.

TABLE 1

|  | First Example | Second Example | Third Example |
| --- | --- | --- | --- |
| Mold Clamping Force F | 450 ton | 450 ton | 450 ton |
| Nozzle Touch Force f | 10 ton | 10 ton | 10 ton |
| Injection Time t1 of Mold A | 2 seconds | 2 seconds | 2 seconds |
| Dwell Time t2 of Mold A | 3 seconds | 3 seconds | 3 seconds |
| Cooling Time t3 of Mold A | 15 seconds | 15 seconds | 15 seconds |
| Injection Time t11 of Mold B | 2 seconds | 2 seconds | 2 seconds |
| Dwell Time t21 of Mold B | 3 seconds | 3 seconds | 3 seconds |
| Cooling Time t31 of Mold B | 15 seconds | 15 seconds | 15 seconds |
| Thickness L1 of Space 6A of Mold A | 0.1 mm | 0.1 mm | 1 mm |
| Thickness L2 of Space 6A of Mold B | 0.1 mm | 0.1 mm | 1 mm |
| Operation Completion Time of Coupling Portion Movement Unit of Mold A | When mold closing completed | When dwelling time elapsed | When dwelling time elapsed |
| Operation Release Start Time of Coupling Portion Movement Unit of Mold A | When cooling time elapsed | When cooling time elapsed | When cooling time elapsed |
| Operation Completion Time of Coupling Portion Movement Unit of Mold B | When mold closing completed | When dwelling time elapsed | When dwelling time elapsed |
| Operation Release Start Time of Coupling Portion Movement Unit of Mold B | When cooling time elapsed | When cooling time elapsed | When cooling time elapsed |
| Molding Cycle Time of Mold A | 30 seconds | 30 seconds | 30 seconds |
| Molding Cycle Time of Mold B | 30 seconds | 30 seconds | 30 seconds |
| Molding Apparatus Occupancy Time per Molded Product | 15 seconds | 15 seconds | 15 seconds |
| External Appearance Quality of Molded Product | a | a | a |
| Dimensional Quality of Molded Product | a | a | a |

TABLE 2

|  | First Comparative Example | Second Comparative Example | Third Comparative Example |
| --- | --- | --- | --- |
| Mold Clamping Force F | 450 ton | 450 ton | 450 ton |
| Nozzle Touch Force f | 10 ton | 10 ton | 10 ton |

TABLE 2-continued

|  | First Comparative Example | Second Comparative Example | Third Comparative Example |
|---|---|---|---|
| Injection Time t1 of Mold A | 2 seconds | 2 seconds | 2 seconds |
| Dwell Time t2 of Mold A | 3 seconds | 3 seconds | 3 seconds |
| Cooling Time t3 of Mold A | 15 seconds | 15 seconds | 15 seconds |
| Injection Time t11 of Mold B | 2 seconds | 2 seconds | 2 seconds |
| Dwell Time t21 of Mold B | 3 seconds | 3 seconds | 3 seconds |
| Cooling Time t31 of Mold B | 15 seconds | 15 seconds | 15 seconds |
| Thickness L1 of Space 6A of Mold A | 0.1 mm | 0.1 mm | 0.1 mm |
| Thickness L2 of Space 6A of Mold B | 0.1 mm | 0.1 mm | 0.1 mm |
| Operation Completion Time of Coupling Portion Movement Unit of Mold A | Not used | When mold closing completed | Magnetic force always applied |
| Operation Release Start Time of Coupling Portion Movement Unit of Mold A | Not used | When t2 elapsed | Magnetic force always applied |
| Operation Completion Time of Coupling Portion Movement Unit of Mold B | Not used | When mold closing completed | Magnetic force always applied |
| Operation Release Start Time of Coupling Portion Movement Unit of Mold B | Not used | When t21 elapsed | Magnetic force always applied |
| Molding Cycle Time of Mold A | 30 seconds | 30 seconds | 30 seconds |
| Molding Cycle Time of Mold B | 30 seconds | 30 seconds | 30 seconds |
| Molding Apparatus Occupancy Time per Molded Product | 15 seconds | 15 seconds | 15 seconds |
| External Appearance Quality of Molded Product | b | b | b |
| Dimensional Quality of Molded Product | b | b | b |

TABLE 3

|  | Fourth Comparative Example |
|---|---|
| Mold Clamping Force F | 450 ton |
| Nozzle Touch Force f | 10 ton |
| Injection Time t1 of Mold A | 2 seconds |
| Dwell Time t2 of Mold A | 3 seconds |
| Cooling Time t3 of Mold A | 15 seconds |
| Injection Time t11 of Mold B | 2 seconds |
| Dwell Time t21 of Mold B | 3 seconds |
| Cooling Time t31 of Mold B | 15 seconds |
| Thickness L1 of Space 6A of Mold A | 0.1 mm |
| Thickness L2 of Space 6A of Mold B | 0.1 mm |
| Operation Completion Time of Coupling Portion Movement Unit of Mold A | Not used |
| Operation Release Start Time of Coupling Portion Movement Unit of Mold A | Not used |
| Operation Completion Time of Coupling Portion Movement Unit of Mold B | Not molded |
| Operation Release Start Time of Coupling Portion Movement Unit of Mold B | Not molded |
| Molding Cycle Time of Mold A | 30 seconds |
| Molding Cycle Time of Mold B | Not molded |
| Molding Apparatus Occupancy Time per Molded Product | 30 seconds |
| External Appearance Quality of Molded Product | a |
| Dimensional Quality of Molded Product | a |

The present disclosure provides a technique with which a molded product having excellent external appearance quality and dimensional quality can be achieved and productivity can be increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-155595, filed Sep. 16, 2020, which is hereby incorporated by reference herein in its entirety.

What is claimed is:

1. A mold which is attachable to an injection molding apparatus, comprising:
   a stationary mold;
   a movable mold;
   a first unit including a first coupling member and a second coupling member and configured to perform coupling and uncoupling of the stationary mold and the movable mold; and
   a second unit configured to adjust a force acting between the first coupling member and the second coupling member in a mold closing direction of each of the stationary mold and the movable mold,
   wherein the first unit and the second unit are configured to, in a state where the mold is removed from the injection molding apparatus, generate a mold closing force between the stationary mold and the movable mold.

2. The mold according to claim 1, wherein the coupling is performed by inserting the first coupling member into a hole of the second coupling member.

3. The mold according to claim 2, wherein the second coupling member is a pin, and the first coupling member is a stopper.

4. The mold according to claim 2, wherein the first unit includes an air cylinder and performs insertion of the first coupling member by driving the air cylinder.

5. The mold according to claim 1, wherein the first unit moves the first coupling member in a direction intersecting with the mold closing direction.

6. The mold according to claim 1, wherein the second unit moves the second coupling member in a direction along the mold closing direction.

7. The mold according to claim 1, wherein the second unit includes a block to which the second coupling member is fixed and a drive source that moves the block.

8. The mold according to claim 7, wherein the drive source is a hydraulic cylinder.

9. The mold according to claim 7, wherein the second unit includes a spring which moves the block in releasing an operation of the drive source.

10. The mold according to claim 1, wherein the second unit is configured to press the second coupling member against the first coupling member to generate the force acting in the mold closing direction.

11. The mold according to claim 10, wherein the first coupling member is attached to the stationary mold, and the second coupling member is attached to the movable mold.

12. The mold according to claim 10, wherein the first coupling member is attached to the movable mold, and the second coupling member is attached to the stationary mold.

13. The mold according to claim 1, wherein the movable mold includes a mounting plate, and the second unit is arranged between the mounting plate of the movable mold and the stationary mold.

14. The mold according to claim 1, wherein the stationary mold includes a mounting plate, and the second unit is arranged between the mounting plate of the stationary mold and the movable mold.

15. The mold according to claim 1, wherein the second coupling member penetrates a mold plate that forms a cavity.

16. An injection molding system comprising:
   an injection molding apparatus which includes an injection nozzle; and
   the mold according to claim 1 attached to the injection molding apparatus.

17. The injection molding system according to claim 16, further comprising:
   a controller configured to control the injection molding apparatus; and
   a controller configured to control the first unit and the second unit of the mold.

18. A method for manufacturing a molded product by performing injection molding using the injection molding system according to claim 16.

19. The method according to claim 18, further comprising:
   performing injection of resin into the mold and coupling of the stationary mold and the movable mold while arranging the mold between a stationary platen and a movable platen of the injection molding apparatus; and
   carrying out the mold from between the stationary platen and the movable platen in a state in which the stationary mold and the movable mold are coupled.

20. The method according to claim 19, further comprising carrying a mold different from the mold into between the stationary platen and the movable platen in a state in which the stationary mold and the movable mold are coupled.

* * * * *